United States Patent
Xia et al.

(10) Patent No.: US 11,531,812 B2
(45) Date of Patent: Dec. 20, 2022

(54) NATURAL LANGUAGE PROCESSING FOR MAPPING DEPENDENCY DATA AND PARTS-OF-SPEECH TO GROUP LABELS

(71) Applicant: Accenture Global Solutions Limited, Dublin (IE)

(72) Inventors: Andrew Xia, Toronto (CA); Tal Beno, Thornhill (CA); Yuly Basovich, Toronto (CA); Amar Abdul Waris Mohmand, Toronto (CA)

(73) Assignee: Accenture Global Solutions Limited, Dublin (IE)

( * ) Notice: Subject to any disclaimer, the term of this patent is extended or adjusted under 35 U.S.C. 154(b) by 328 days.

(21) Appl. No.: 16/924,920

(22) Filed: Jul. 9, 2020

(65) Prior Publication Data

US 2021/0056263 A1    Feb. 25, 2021

Related U.S. Application Data

(60) Provisional application No. 62/967,334, filed on Jan. 29, 2020, provisional application No. 62/889,815, filed on Aug. 21, 2019.

(51) Int. Cl.
*G06F 40/226* (2020.01)
*G06F 40/237* (2020.01)
(Continued)

(52) U.S. Cl.
CPC ............ *G06F 40/284* (2020.01); *G06F 40/30* (2020.01); *G06F 40/40* (2020.01)

(58) Field of Classification Search
CPC ...... G06F 40/20; G06F 40/205; G06F 40/226; G06F 40/237; G06F 40/279; G06F 40/295; G06F 40/30; G06F 40/35
(Continued)

(56) References Cited

U.S. PATENT DOCUMENTS 5,930,746 A * 7/1999 Ting ..................... G06F 40/211
                                                   704/9
9,390,087 B1 * 7/2016 Roux .................... G06F 40/205
(Continued)

OTHER PUBLICATIONS

AllenNLP.org [online], "Open Information Extraction," available on or before Sep. 14, 2018, via Internet Archive: Wayback Machine URL<https://web.archive.org/web/20180914041406/https://demo.allennlp.org/open-information-extraction>, retrieved on Oct. 5, 2020, retrieved from URL<https://demo.allennlp.org/open-information-extraction>, 1 page.
(Continued)

*Primary Examiner* — Martin Lerner
(74) *Attorney, Agent, or Firm* — Fish & Richardson P.C.

(57) ABSTRACT

Methods, systems, and apparatus, including computer programs encoded on computer storage media, for information extraction using natural language processing. One of the methods includes determining, for one or more tokens from a plurality of tokens that represent an unstructured sentence, a token type from a plurality of predetermined token types that indicates an element type for a phrase that corresponds to the token and has one or more properties using dependency data and a part-of-speech label for the token; assigning, for a token whose associated dependency data indicates that the token has a child, data for the child token to one of the one or more properties for the token type of the token; and providing, for use by a downstream semantic system and for the token, a textual representation of the phrase for the token and the phrases for one or more of the child tokens.

24 Claims, 4 Drawing Sheets

(51) Int. Cl.
  G06F 40/279 (2020.01)
  G06F 40/30 (2020.01)
  G06F 40/284 (2020.01)
  G06F 40/40 (2020.01)
(58) Field of Classification Search
  USPC .................................................. 704/1, 9, 10
  See application file for complete search history.

(56) References Cited

U.S. PATENT DOCUMENTS

| | | | | |
|---|---|---|---|---|
| 9,569,425 | B2* | 2/2017 | Jackson | G06F 40/253 |
| 9,965,460 | B1* | 5/2018 | Wasiuk | G06F 40/295 |
| 10,019,437 | B2* | 7/2018 | Ho | G06F 40/30 |
| 10,460,028 | B1* | 10/2019 | Flann | G06F 40/289 |
| 10,467,344 | B1* | 11/2019 | Jade | G06F 40/284 |
| 10,810,368 | B2* | 10/2020 | New | G06F 40/205 |
| 10,949,621 | B2* | 3/2021 | Omanwar | G06F 40/289 |
| 2006/0253275 | A1* | 11/2006 | Parkinson | G06F 40/211 |
| | | | | 704/9 |
| 2006/0277465 | A1* | 12/2006 | Pandit | G06F 40/30 |
| | | | | 715/234 |
| 2008/0243772 | A1* | 10/2008 | Fuxman | G06F 40/30 |
| 2009/0119090 | A1* | 5/2009 | Niu | G06F 40/247 |
| | | | | 704/1 |
| 2009/0326925 | A1* | 12/2009 | Crider | G06F 40/30 |
| | | | | 704/9 |
| 2013/0013291 | A1* | 1/2013 | Bullock | G06F 40/30 |
| | | | | 704/9 |
| 2017/0337183 | A1* | 11/2017 | Cross, III | G06F 40/30 |
| 2018/0096358 | A1* | 4/2018 | Sundaram | G06F 40/253 |
| 2018/0260381 | A1* | 9/2018 | Carreras | G06F 40/289 |
| 2019/0163691 | A1* | 5/2019 | Brunet | G06F 40/35 |
| 2019/0341039 | A1* | 11/2019 | Bharadwaj | G06F 40/30 |
| 2020/0042594 | A1* | 2/2020 | Korda | G06F 40/284 |
| 2020/0151277 | A1* | 5/2020 | Fisher | G06F 40/30 |
| 2020/0312297 | A1* | 10/2020 | Chatterjee | G06F 40/169 |
| 2020/0342053 | A1* | 10/2020 | Mwarabu | G06F 40/284 |

OTHER PUBLICATIONS

Bhutani et al., "Nested Propositions in Open Information Extraction," Proceedings of the 2016 Conference on Empirical Methods in Natural Language Processing, Nov. 1-5, 2016, Austin, Texas, USA, 55-64.
De Marneffe et al., "Universal Stanford Dependencies: A cross-linguistic typology," Proceedings of the Ninth International Conference on Language Resources and Evaluation, May 2014, Reykjavik, Iceland, 4585-4592.
Del Corro et al., "ClausIE: Clause-Based Open Information Extraction," Proceedings of the 22nd International Conference on World Wide Web, May 2013, Rio de Janeiro, Brazil, 355-366.
Fader et al., "Identifying Relations for Open Information Extraction," Proceedings of the 2011 Conference on Empirical Methods in Natural Language Processing, Jul. 27-31, 2011, Edinburgh, Scotland, 1535-1545.
Gashtevoski et al., "MinIE: Minimizing Facts in Open Information Extraction," Proceedings of the 2017 Conference on Empirical Methods in Natural Language Processing, Sep. 7-11, 2017, Copenhagen, Denmark, 2630-2640.
GitHub.com [online], "dair-iitd / OpenIE-standalone," May 23, 2017, last updated Feb. 28, 2020, retrieved on Apr. 27, 2020, retrieved from URL<https://github.com/dair-iitd/OpenIE-standalone>, 5 pages.
Mausam et al., "Open Language Learning for Information Extraction," Proceedings of the 2012 Conference on Empirical Methods in Natural Language Processing, Jul. 12-14, 2012, Jeju Island, Korea, 523-534.
mpi-inf.mpg.de [online], "ClausIE: Clause-Based Open Information Extraction," upon informaiton and belief, avilable no later than 2014, retrieved on Oct. 5, 2020, retrieved from URL<https://gate.d5.mpi-inf.mpg.de/ClausIEGate/ClausIEGate/>, 2 pages.
Saha et al., "Bootstrapping for Numerical Open IE," Proceedings of the 55th Annual Meeting of the Association for Computational Linguistics, Jul. 30-Aug. 4, 2017, Vancouver, Canada, 317-323.
spaCy.io [online], "spaCy—Industrial-Strength Natural Language Processing," available on or before Aug. 21, 2015, via Internet Archive: Wayback Machine URL<https://web.archive.org/web/20150821014757/https://spacy.io/>, retrieved on Apr. 27, 2020, retrieved from URL<https://spacy.io/, 4 pages.
Stanford.edu [online], "Stanford Open Information Extraction," available on or before Jan. 28, 2016, via Internet Archive: Wayback Machine URL<https://web.archive.org/web/20160128064710/https://nlp.stanford.edu/softwfare/openie.html>, retrieved on Oct. 5, 2020, retrieved from URL<https://nlp.stanford.edu/software/openie.html>, 6 pages.
White et al., "The Universal Decompositional Semantics Dataset and Decomp Toolkit," arXiv, Sep. 30, 2019, arXiv:1909.1385v1, 10 pages.
Wikipedia.org [online], "Allen Institute for IA," May 11, 2012, last updated Feb. 2, 2020, retrieved on Apr. 27, 2020, retrieved from URL<https://en.wikipedia.org/wiki/Allen_Institute_for_AI>, 3 pages.
Wikipedia.org [online], "Spark NLP," Mar. 29, 2019, last updated Oct. 15, 2019, retrieved on Apr. 27, 2020, retrieved from URL<https://en.wikipedia.org/wiki/Spark_NLP>, 3 pages.
Yates et al., "TextRunner: Open Information Extraction on the Web," Proceedings of NAACL HLT Demonstration Program, Apr. 2007, Rochester, New York, USA, 25-26.

\* cited by examiner

NATURAL LANGUAGE PROCESSING FOR MAPPING DEPENDENCY DATA AND PARTS-OF-SPEECH TO GROUP LABELS

CROSS-REFERENCE TO RELATED APPLICATION

This application claims the benefit of U.S. Provisional Patent Application No. 62/889,815, filed Aug. 21, 2019, and U.S. Provisional Patent Application No. 62/967,334, filed Jan. 29, 2020, which are incorporated by reference.

BACKGROUND

Natural language processing systems can analyze unstructured text to determine patterns in or a meaning of the text. Some natural language processing systems can use artificial intelligence, rules or statistical analysis.

Information extraction systems can extract machine readable data from unstructured text. For example, an information extraction system, e.g., as part of a natural language processing system, can receive unstructured text, analyze the text, e.g., using artificial intelligence, and provide machine readable data as output. Another system can use the machine readable data, e.g., to determine search results responsive to a query.

SUMMARY

In some implementations, a natural language processing system, e.g., an information extraction system, can apply semantic labels to words or phrases within a sentence based on the part-of-speech type of the respective word or phrase in the sentence. Some examples of part-of-speech type include subject, predicate or object.

To improve a quality of machine readable data generated by natural language processing systems, a natural language processing system can determine a type for each atomic word or phrase, e.g., atomic element, in the sentence. Using the type, the natural language processing system can determine properties for the type. The properties can represent different interactions between elements within a sentence. By maintaining data for these interactions between elements, natural language processing systems can have increased accuracy, improve an accuracy of semantic systems that process the machine readable data, or both.

The natural language processing system can create tokens that identify the type and the properties. The natural language processing system can provide a group of tokens that represent a sentence to a semantic system, generate a textual representation of the group of tokens, e.g., a structured string, and provide the textual representation to a semantic system, or both.

In general, one aspect of the subject matter described in this specification can be embodied in methods that include the actions of maintaining, by a computing device and in memory, a plurality of tokens that represent an unstructured sentence that includes a plurality of words, each of the tokens for a corresponding phrase that includes at least one word from the plurality of words, having a part-of-speech label, and associated with dependency data that indicates a parent-child relationship between the token and at least one other token in the plurality of tokens; determining, by the computing device and for one or more tokens from the plurality of tokens, a token type from a plurality of predetermined token types that i) indicates an element type for the phrase that corresponds to the token and ii) has one or more properties using the dependency data and the part-of-speech label for the token, each token type from the plurality of predetermined token types having different properties; assigning, by the computing device for a token from the plurality of tokens whose associated dependency data indicates that the token has a child, data for the child token to one of the one or more properties for the token type of the token; and providing, by the computing device for use by a downstream semantic system and for the token from the plurality of tokens whose associated dependency data indicates that the token has a child, a textual representation of the phrase for the token and the phrases for one or more of the child tokens assigned to one of the one or more properties of the token. Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Providing, for use by the downstream semantic system, the textual representation can include providing, by the computing device for use by a knowledge graph system and for the token from the plurality of tokens whose associated dependency data indicates that the token has a child, the textual representation of the phrase for the token and the phrases for each of the child tokens assigned to one of the one or more properties of the token. Providing, for use by the downstream semantic system, the textual representation can include providing, by the computing device for use by an inference engine and for the token from the plurality of tokens whose associated dependency data indicates that the token has a child, the textual representation of the phrase for the token and the phrases for each of the child tokens assigned to one of the one or more properties of the token.

In some implementations, maintaining, by the computing device and in memory, the plurality of tokens can include maintaining, by the computing device and in memory, the plurality of tokens, each of the tokens for a corresponding atomic word or phrase that includes at least one word from the plurality of words. An atomic phrase can include a proper noun. Maintaining, by the computing device and in memory, the plurality of tokens can include maintaining, by the computing device and in memory, the plurality of tokens that have a tree structure, the dependency data for the plurality of tokens identifying a verb token for a verb from the unstructured sentence as a root token.

In some implementations, providing the textual representation of the phrase for the token and the phrases for each of the child tokens assigned to one of the one or more properties of the token can include providing a textual representation of a clause extracted from the unstructured sentence. The method can include providing, for each of multiple properties from two or more properties for the token type, a textual representation of a respective clause extracted from the unstructured sentence, each of the multiple textual representations including one or more different phrases than the other textual representations.

In some implementations, providing the textual representation of the phrase for the token and the phrases for each of the child tokens assigned to one of the one or more properties of the token can include providing a nested triple representation of a clause extracted from the unstructured sentence. Determining, for each token from the plurality of tokens, the token type from the plurality of predetermined token types can include determining, by the computing device and for each token from the plurality of tokens, the token type from the plurality of predetermined token types using the dependency data and the part-of-speech label for the token and, for each child token identified by the dependency data for the token, the dependency data and the part-of-speech label for the child token. Determining, for each token from the plurality of tokens, the token type from the plurality of predetermined token types can include determining, by the computing device and for each token from the plurality of tokens, the token type from the plurality of predetermined token types using the dependency data and the part-of-speech label for the token and, for at least one sibling token identified by the dependency data for the token, the dependency data and the part-of-speech label for the sibling token.

In some implementations, the method can include receiving, by the computing device, data representing the unstructured sentence that includes the plurality of words. The method can include generating, by the computing device, a dependency parse of the unstructured sentence by assigning, to each word of the plurality of words, a dependency relationship label that identifies a relationship between the word and another word of the plurality of words. The method can include determining, by the computing device and for one or more of the dependency relationship labels, a mapped dependency relationship label based on the dependency relationship label. The method can include determining, by the computing device and for each word of the plurality of words, a part-of-speech label that identifies a part of speech for the word. The method can include determining, by the computing device and for each part-of-speech label, a mapped part-of-speech label based on the part-of-speech label. The method can include selecting, by the computing device and for two or more words of the plurality of words using the respective dependency relationship labels and the respective mapped part-of-speech labels, the mapped dependency relationship label and the mapped part-of-speech label of one of the two or more words to represent the two or more words as a group dependency relationship label and a group part-of-speech label.

In some implementations, determining the mapped dependency relationship label based on the dependency relationship label can include accessing a table that maps one or more respective dependency relationship labels to a respective dependency relationship label. Determining the mapped part-of-speech label based on the part-of-speech label can include accessing a table that maps one or more respective part-of-speech labels to a respective part-of-speech label. Determining the mapped dependency relationship label based on the dependency relationship label can include accessing rules that indicate a condition to satisfy for mapping one or more respective dependency relationship labels to a respective dependency relationship label. Determining the mapped part-of-speech label based on the part-of-speech label can include accessing rules that indicate a condition to satisfy for mapping one or more respective part-of-speech labels to a respective part-of-speech label.

In some implementations, the method can include generating, by the computing device, a dependency tree of the plurality of words based on the dependency relationship labels and the part-of-speech labels. The method can include updating, by the computing device, the dependency tree based on the mapped dependency relationship labels, the mapped part-of-speech labels, the group dependency relationship label, and the group part-of-speech label. The method can include determining, by the computing device, whether the dependency tree is valid. Determining the identification labels can be based on determining that the dependency tree is valid.

The subject matter described in this specification can be implemented in various embodiments and may result in one or more of the following advantages. In some implementations, the systems, methods, the data structures, or a combination of these, described in this document can facilitate the preservation of more granular pieces of data compared to prior data structures; can enable downstream semantic applications to analyze more detailed, more complex, or both, information, e.g., sub-relations, extracted from unstructured data, or both. The systems, methods, the data structures, or a combination of these, described in this document can reduce an amount of analysis of a structured representation of a sentence necessary by downstream applications. In some implementations, the systems, methods, the data structures, or a combination of these, described in this document can enable more accurate downstream systems by providing the downstream systems with a complex extraction data structure, e.g., nested triple representations or structured tokens, that represents inter-proposition relationships, convey sub-relationships, or both. The complex extraction data structure can enable more accurate identification of conditional relationships included in unstructured data, decomposition of unstructured data more granularly, or both, than prior systems. In some implementations, parsing of the complex extraction data structure by a downstream system can enable the downstream system to directly work with the information from an unstructured sentence as structured data. Therefore, in some situations, the complex extraction data structure can enable the use of downstream systems that are traditional algorithms or systems that do not include further machine learning or neural network based components that extract data from the unstructured sentence or portions of the unstructured sentence.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference numbers represent corresponding parts throughout.

DETAILED DESCRIPTION

Information extraction is a subdomain of natural language processing that structures unstructured text into a machine readable format, and involves semantic labeling of words within a sentence as subject, predicate, or object. A system may apply information extraction in a fixed manner to unstructured text. A system may adjust the information extraction process for a particular scenario where some linguistic patterns may be more common. Information extraction may be useful for searching information, reading comprehension, constructing knowledge graphs, summarizing information, identifying anomalies and patterns, and pre-processing large amounts of data.

Figure 1:
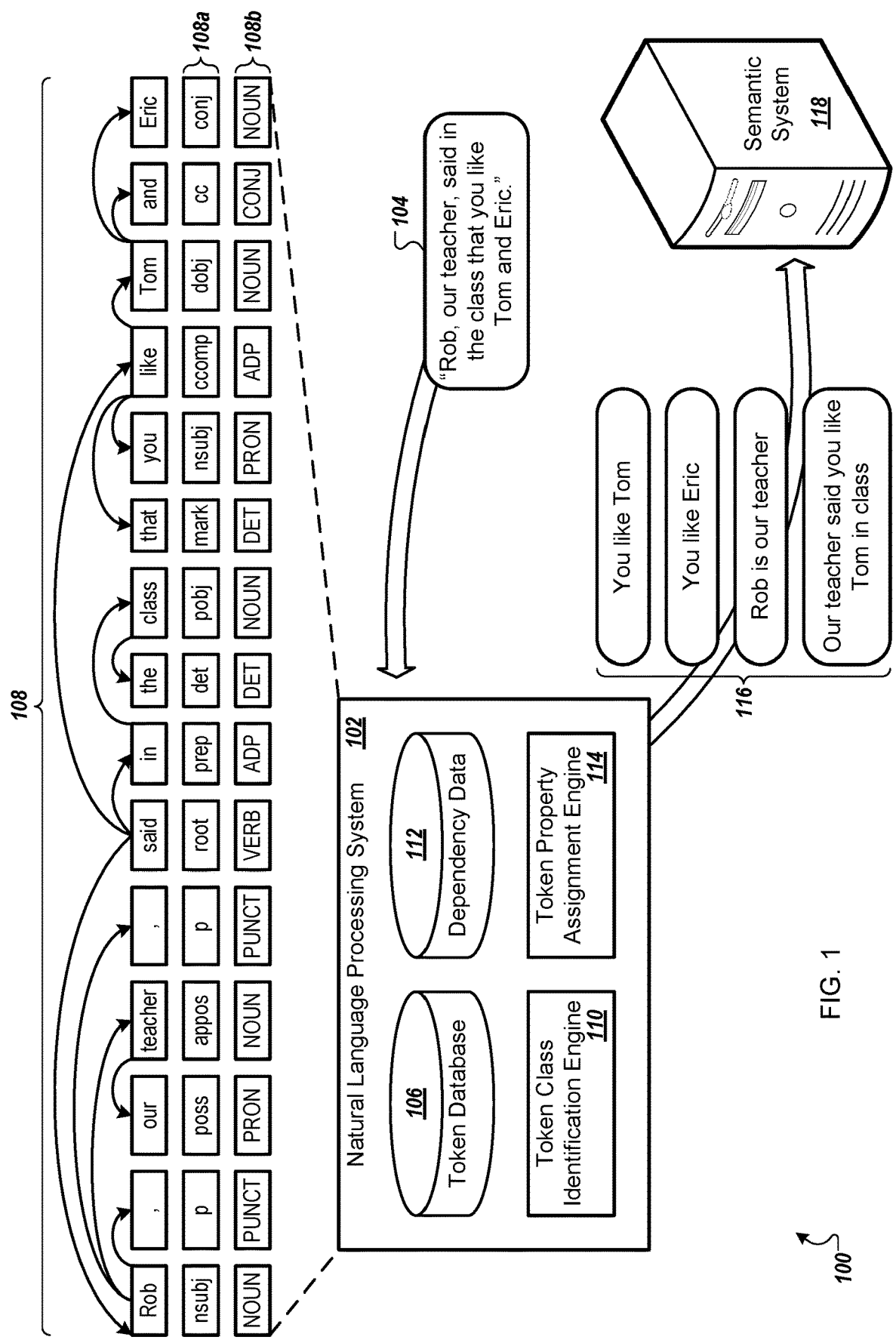
FIG. 1 depicts an example environment in which a natural language processing system generates multiple textual representations for an unstructured sentence.

FIG. 1 depicts an example environment 100 in which a natural language processing system 102 generates multiple textual representations 116 for an unstructured sentence 104. The natural language processing system 102 can be any appropriate system, such as an information extraction tool. The unstructured sentence 104 can be any appropriate type of sentence. For instance, the sentence can be a sentence with multiple relationships, e.g., multiple verbs, or clauses.

A clause can be a verb that symbolizes a relationship or action between one or more participants, e.g., actors, objects, or both. A clause token can have, as properties, one or more of a subject, an object, a modifier, a descriptor, an indirect object, a time, or an introduction. A subject can be an actor or another clause that this clause is "about". An object can be an actor or another clause that this clause is influencing or directed upon. A modifier can be a collection of modifiers that influence this clause. A descriptor can be a collection of supplementary relationships that influence this clause. An indirect object can be an indirect object that this clause may influence in addition to the object. A time can be a time modifier on this clause, e.g., that indicates a time when an action did or will take place. An introduction can be a token that represents a semantically meaningless "glue" word that serves to introduce the clause. For the example unstructured sentence "Rob, our teacher, said in class that you like Tom and Eric," the verbs "said" and "like" can be clauses.

The natural language processing system 102 receives data for the unstructured sentence 104. For instance, the natural language processing system 102 receives the data from another system, such as a data corpus or a server. The data corpus can store data for multiple documents and send one or more unstructured sentences to the natural language processing system 102 that were extracted from one of the multiple documents.

The natural language processing system 102 can determine, using the unstructured sentence 104, tokens for the unstructured sentence 104. A token can be a phrase, e.g., a single word or collection of words, that represents a "thing". The natural language processing system 102 can analyze the unstructured sentence 104 to determine one or more tokens for the unstructured sentence 104. For instance, the natural language processing system 102 can extract multiple tokens from the unstructured sentence 104.

The natural language processing system 102 can store data for the token in a token database 106. The data can indicate the token, e.g., "Rob", an identifier for the unstructured sentence 104, e.g., used to determine all tokens for the unstructured sentence 104, a token identifier, or a combination of two or more of these. In some examples, a token can include a dependency label, a part-of-speech label, a plurality label, a lemma label, a tense label, or a combination of two or more of these. Examples of dependency labels are included in Table 10, below. Examples of part-of-speech labels are included in Table 11, below. A plurality label can indicate whether the token, e.g., the thing represented by the token, is plural. A lemma label can represent a lemma of the original token, e.g., original word. A tense label can indicate, for a verb, whether the verb is past, present, or future tense. In some examples, the tense label can include different values depending on a language in which the unstructured sentence 104 is written. For instance, when the language is a Chinese or Dyirbal language, a verb might not have a tense. In some implementations, the tense label can include remote past, recent past, today past, present, today or near future, and remote future. In some instances, the tense label can include a relative tense, e.g., future perfect, pluperfect, or both.

In some examples, the token database 106 can store the tokens in a graph structure, e.g., such that each token represents a node in the graph. One example of a graph includes a dependency tree 108. Each of the tokens in the dependency tree 108 can have one or more labels, such as a dependency label 108a, a part-of-speech label 108b, or both.

For the unstructured sentence "Rob, our teacher, said that you like Tom and Eric", the natural language processing system 102 can obtain the dependency tree 108. In the dependency tree 108, each arrow can represent a parent-child relationship such that the arrow side is the child token. In the dependency tree 108, the word "said" would be assigned a dependency of ROOT as it is the root of this tree, e.g., represented by arrows only going out of the token for "said" and not point toward "said". "Said" can have a dependency label 108a of ROOT to indicate that "said" is the root of the dependency tree 108. "Said" can have a part-of-speech label 108b of "VERB" to indicate that "said" is a verb.

The natural language processing system 102 includes a token class identification engine 110 that analyzes data for each of the tokens to determine a class for the token, as described in more detail below. Some example classes include an actor, a modifier, a descriptor, a conjunction, and a clause.

An actor can be a participant of some relationship, e.g., clause. For instance, an actor can be a noun, e.g., "Rob" or "class". An actor token can have, as properties, one or more tokens, modifiers, descriptors, aliases, or a combination of these. An actor token can have properties for a determiner label, a possession label, or both. The tokens can be a collection of tokens that the actor represents. A modifier can be a modifier that influences the actor. A descriptor can represent a supplementary relationship that influences the actor. An alias can indicate another actor that could act in place of this actor in the relationships this actor participates in, e.g., the actor "Rob" can have an alias of "teacher". A determiner label can indicate a determiner of the actor. A possession label can indicate a possessive modifier of the actor.

A modifier can be a phrase that directly influences some other token. A modifier token can have, as properties, one or more other modifiers, one or more descriptors, or both. The modifiers can be a collection of one or more other modifiers that influence this modifier. The descriptors can be a collection of one or more supplementary relationships that influence this modifier. For example, in the sentence "I like red apples", "red" would be a modifier.

A descriptor can represent a supplementary relationship with another clause or actor that influences some element. For instance, a descriptor can be a preposition. A descriptor token can include, as properties, one or more modifiers, one or more descriptors, a target, or a combination of two or more of these. A modifier can be a modifier that influences this descriptor. A descriptor can represent a supplementary relationships that influences this descriptor. A target can be another clause or actor that this descriptor might be describing a relationship to or from. For instance, in the sentence "I like apples in the forest", "in" is a descriptor.

A conjunction can represent a collection of other tokens that act as a single element, e.g., "the Royal Bank of Canada". A conjunction token can include, as properties, two or more conjuncts, a coordinator, and an introduction label. Each of the conjuncts can be a token within the collection represented by the conjunction. The coordinator can be an optional token that joins the conjuncts, e.g., "and". The introduction label can indicate an optional token that introduces the conjuncts. For the unstructured sentence 104 "Rob, our teacher, said in the class that you like Tom and Eric", "Tom and Eric" is a conjunction of actors.

For the unstructured sentence 104, the token class identification engine 110 can determine that the tokens "Rob", "teacher", "class", "you", "Tom", "Eric" are actors. The token class identification engine 110 can update the token database 106 to include data for each of the tokens corresponding class. The data can include corresponding dependency labels 108a, part-of-speech labels 108b, or both.

In some examples, the token database 106 includes a different data structure for each of the classes. For instance, the data structure can be specific to the properties of the corresponding class. In one example, a first data structure for an actor token includes a field for an alias, e.g., the token for "Rob" would have an alias field that references the "teacher" token, while the data structures for the other class types do not include a field for an alias.

In these examples, the token class identification engine 110 can receive data that identifies a token, determine a class for the token, and select a data structure using the class for the token. The token class identification engine 110 can then store a new data structure for the token in the token database 106, e.g., enabling the token database 106 to have different data structures for the different token classes.

The natural language processing system 102 can determine dependency data 112 for the tokens, as described in more detail below. For instance, the token class identification engine 110 can determine that the tokens "the" and "our" each are of the modifier class. A token property assignment engine 114, included in the natural language processing system 102, can determine that the modifier token "the" influences the actor token "class" and the modifier token "our" influences the actor token "teacher". As a result, the token property assignment engine 114 can store dependency data 112 that indicates that the actor token "class" has, as a modifier property, the modifier token "the" and that the actor token "teacher" has, as a modifier property, the modifier token "our".

In implementations when the token database 106 uses different data structures for each of the class types, the token database 106 can maintain the dependency data 112. For example, the token database 106 can maintain, for the actor token "teacher", a data structure that references the modifier token "our" as a modifier property. The token class identification engine 110 can create the data structure for the actor token "teacher". The token property assignment engine 114 can update the data structure to include a reference to the modifier token "our" as a modifier property.

In some implementations, the token database 106 can be separate from the dependency data 112. For instance, the token database 106 can be stored in a separate portion of memory than the dependency data 112. In some examples, the natural language processing system 102 can have the token database 106 implemented on a different device than a device that implements the dependency data 112.

The token class identification engine 110 can select a descriptor class for the token "in". The token property assignment engine 114 can determine that the descriptor token "in" has a target of "class". The token property assignment engine 114 can store data in the dependency data 112 to indicate the relationship between the descriptor token "in" and the actor token "class".

The token property assignment engine 114 can determine one or more conjunctions for the unstructured sentence 104. For instance, the token property assignment engine 114 can analyze the tokens for the unstructured sentence 104, as described in more detail below, and determine that a conjunction joins the tokens "Tom" and "Eric". The token property assignment engine 114 can create a conjunction token for the determined conjunction. The conjunction token can include, as conjuncts properties, references to the actor token "Tom" and the actor token "Eric".

After the natural language processing system 102 generates tokens and dependency data 112 for the unstructured sentence 104, the natural language processing system 102 can determine output clauses for the unstructured sentence. The natural language processing system 102 can generate textual representations for the output clauses, e.g., nested triple representations.

For instance, given the unstructured sentence 104, the natural language processing system 102 can determine that the unstructured sentence includes two output clauses. The first clause includes "like" with the subject of "you" and the object of "Tom and Eric" (as a conjunction) forming the idea of "you like Tom and Eric". This first clause can function as the object of a second, larger clause of "said" with the subject of "Rob" forming the idea of "Rob said that you like Tom and Eric". The dependency data 112 represents these clauses and enables the natural language processing system 102 to detect the two clauses based on the unstructured sentence 104.

The natural language processing system 102 can generate a textual representation, e.g., a nested triple representation, for the output clauses. For example, the natural language processing system 102 can generate a textual representation of the first clause as <you; like; Tom and Eric;>. The natural language processing system 102 can generate a textual representation of the second clause as <Rob; said; that <you; like; Tom and Eric;>;> or <Rob; said; that [ID for first clause];>.

The natural language process system 102 is an example of a system implemented as computer programs on one or more computers in one or more locations, in which the systems, components, and techniques described in this document are implemented. A network (not shown), such as a local area network (LAN), wide area network (WAN), the Internet, or a combination thereof, connects the natural language processing system 102, and the semantic system 118. In some examples, the natural language processing system 102 and the semantic system 118 are part of the same system, e.g., implemented on the same device. The natural language processing system 102 may use a single server computer or multiple server computers operating in conjunction with one another, including, for example, a set of remote computers deployed as a cloud computing service.

The natural language processing system 102 can include several different functional components, including the token class identification engine 110 and the token property assignment engine 114. The various functional components of the natural language processing system 102 may be installed on one or more computers as separate functional components or as different modules of a same functional component. For example, the token class identification engine 110 and the token property assignment engine 114 can be implemented as computer programs installed on one or more computers in one or more locations that are coupled to each through a network. In cloud-based systems for example, these components can be implemented by individual computing nodes of a distributed computing system.

Figure 2:
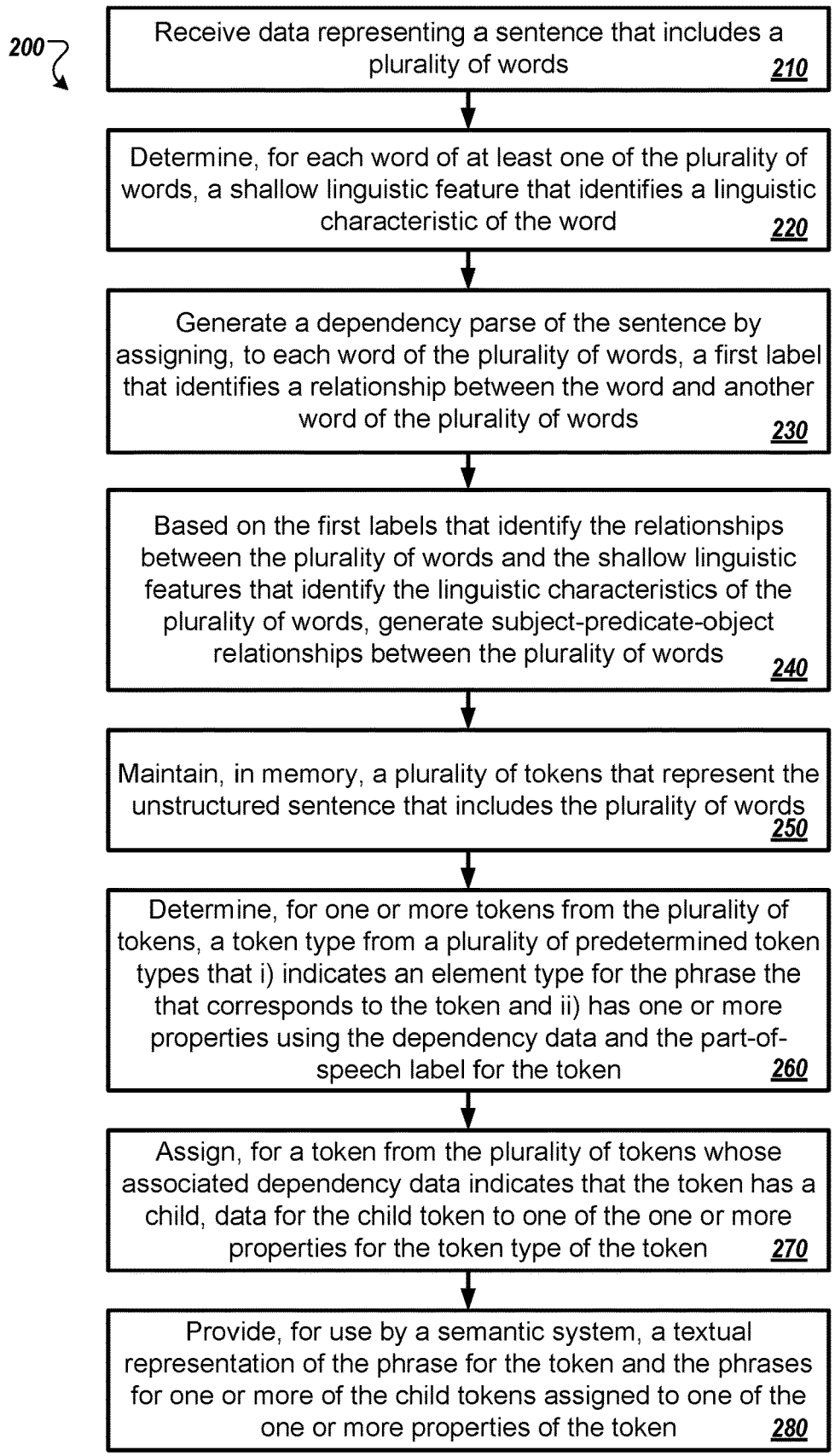
FIG. 2 is a flowchart of an example process for information extraction.

FIG. 2 is a flowchart of an example process 200 for information extraction. In general, the process 200 analyzes various sentences and extracts information from those sentences. The process 200 determines the relationships between the terms of each sentence. The relationships may be in the form of a subject-predicate-object. The process 200 will be described as being performed by a computer system comprising one or more computers, for example, the natural language processing system 102 as shown in FIG. 1.

The system receives data representing a sentence that includes a plurality of words (210). In some implementations, the system removes parenthetical phrases from the data representing the sentence before analyzing the sentence. For example, if the sentence is "John (the person I like) talked to me," then the system would remove "(the person I like)" before analyzing the sentence. The system proceeds to analyze "John talked to me." Removal of parenthetical phrases can reduce noise when a system processes data for the sentence, e.g., the system, a downstream semantic application, or both.

In some implementations, the system can modify the data representing the sentence to maintain a parenthetical phrase but in a different structure. The system can replace the parentheses with commas to change the structure of the parenthetical phrase. For instance, for the sentence "John (the person I like) talked to me," the system can replace the parenthesis "("and")" with the commas "," and ",", respectively. The system can generate a modified sentence as "John, the person I like, talked to me."

The system determines, for each word of at least one of the plurality of words, a shallow linguistic feature that identifies a linguistic characteristic of the word (220). In some implementations, a shallow linguistic feature can be a part-of-speech label for the word, a tense label for the word, a label of whether the word is singular or plural, or a label of whether the word corresponds to the first person, second person, or the third person. For example, a part-of-speech label for the word "class" may be "noun." A part-of-speech label for the word "said" may be "verb." A tense label for the word "class" may be null. A tense label for the word "said" may be "past." A label of whether "class" is singular or plural may be "singular." A label of whether "said" is singular or plural may be null. A label of whether "class" and "said" correspond to the first person, second person, or the third person may be null. A label for whether the word corresponds to the first person, second person, or the third person for the word "you" may be "second."

The system generates a dependency parse of the sentence by assigning, to each word of the plurality of words, a first label that identifies a relationship between the word and another word of the plurality of words (230). The dependency parse of the sentence can include dependency data for one or more of the words or phrases in the sentence. The dependency data can indicate a parent-child relationship between words or phrases in the sentence.

In some implementations, the dependency parse of the sentence is a tree that includes a node for each word of the sentence. Each node, e.g., other than a root node, can have one parent and may have multiple children. In some implementations, each node includes a label for the respective word that defines the relationship between words.

For each node, the system can generate a token such that the combination of tokens represents the unstructured sentence. Each token can be for a corresponding phrase that includes one or more words. For instance, a first token can be for the phrase "Tom" and a second token can be for the phrase "the Royal Bank of Canada."

In some implementations, the system includes each punctuation mark in its own node. For example, the system may include a comma and a period each in their own node.

The system, based on the first labels that identify the relationships between the plurality of words and the shallow linguistic features that identify the linguistic characteristics of the plurality of words, generates subject-predicate-object relationships between the plurality of words (240). In some implementations, the system generates the subject-predicate-object relationships by performing three steps. The system sorts and categorizes the nodes of the dependency parse. The system categorizes each node by examining the children of the node to determine how the children influence the parent node. The system adjusts the categories based on conjugations, relative clauses, and other factors.

In some implementations, the system sorts and categorizes the nodes of the dependency parse by assigning categories such as clause, actor, descriptor, modifier, and token. The system classifies a node as a clause if a verb node plays a dependency role of an adverbial clause, clausal complement, clausal subject, passive clausal subject, prepositional clause, relative clausal modifier, or a root clause. For a clause node, the system may expect to find children nodes that are modifiers, descriptors, a maximum of one subject, a maximum of one object, and a maximum of one introduction. The system can have, as properties for a clause token, data that indicates modifiers, descriptors, a subject, an object, and an introduction.

The system classifies a node as an actor if the node is a noun, pronoun, possessive dependency, adjective, or pleonastic nominal dependency in addition to other requirements. For an actor node, the system may expect to find modifiers, descriptors, and at least one child node as an alias, along with children nodes that are conjugations and mergeable. The system can have, as properties for an actor token, data that indicates modifiers; descriptors; a child node that is an alias, if any; and child nodes that are conjugations and mergeable. The properties for the clause token and the actor token are different, e.g., because the actor token includes a property for a child node that is an alias, the clause token includes data that indicates a subject, or both.

The system classifies a node as a descriptor if the node plays a dependency role of adverbial clause, or relative clause, subject-less clausal complement, preposition, or verb modifier. For a descriptor node, the system may expect to find modifiers, other descriptors, and a maximum of one target for the children nodes. The system can have, as properties for a descriptor token, modifiers, descriptors, and a target for the children nodes.

The system classifies a node as a modifier if the node plays a dependency role of possessive, negation, determiner, number, associative marker, adjectival modifier, adverbial modifier, auxiliary, passive auxiliary, noun-phrase adverbial modifier, or particle. For a modifier node, the system may expect to find children nodes that are other modifiers. The system can have, as properties for a modifier token, data that indicates child nodes that are other modifiers, if any.

In some implementations, the system adjusts the categories based on conjugations, relative clauses, and other factors. The system may manage the adoption of properties between conjugates. The adoption may include that the adopter will mark the adoptee as a property of the adopter, and the adoptee will function as a property of multiple nodes. The system can have, as properties for a conjunction token, data that indicates the conjuncts, e.g., each element within the conjunction; a coordinator, e.g., a token that joins the conjuncts; and data that indicates a token that may introduce the conjuncts.

The system may identify a target for causal descriptors. For actor nodes, the system may extract additional relationships from an actor and its alias or descriptors. For clause nodes, the system may extract relative clauses and conjunctive derivations.

The system maintains, in memory, a plurality of tokens that represent the unstructured sentence that includes the plurality of words (250). Each of the tokens can be for a corresponding phrase that includes at least one word from the plurality of words, have a part-of-speech label, and be associated with dependency data that indicates a parent-child relationship between the token and at least one other token in the plurality of tokens. For instance, the system can maintain the plurality of tokens in a database, such as a token database.

The plurality of tokens can represent a tree structure, e.g., a dependency tree. For example, the dependency data can identify a tree structure for the plurality of nodes. A root node in the dependency tree can represent a verb from the unstructured sentence.

The system determines, for one or more tokens from the plurality of tokens, a token type from a plurality of predetermined token types that i) indicates an element type for the phrase that corresponds to the token and ii) has one or more properties using the dependency data and the part-of-speech label for the token (260). Each token type from the plurality of predetermined token types can have different properties. Some example token types include actor, modifier, descriptor, clause, conjunction, or a combination of two or more of these. Some example element types include token, actor, modifier, descriptor, clause, conjunction, or a combination of two or more of these. When a token has one type, the corresponding element type for the phrase that corresponds to the token can be the same type, e.g., a token type of actor can indicate an element type of actor.

The system assigns, for a token from the plurality of tokens whose associated dependency data indicates that the token has a child, data for the child token to one of the one or more properties for the token type of the token (270). For a sentence "Rob, our teacher, said in the class, that you like Tom and the Royal Bank of Canada," the system can generate tokens for each individual word in the original sentence. The system can create actor tokens for the collection of nouns: "Rob", "teacher", "class", "you", "Tom", "Royal", "Bank", and "Canada". In this example, the system can assign, for the actor token "Rob", data for an alias property that references the actor token for "teacher". The system can assign, as modifiers for the "class" actor token and "teacher" actor token, modifier parameters that identify a "the" modifier token and an "our" modifier token, respectively. For the "class" actor token, the system can assign a descriptor property that references the "in" descriptor token.

The system can merge "Royal Bank of Canada". The system can determine a conjunction, e.g., an "and" conjunction token, that joins "Tom" and "the Royal Bank of Canada".

The unstructured sentence can have two clauses: "like" and "said". The system can assign, as a subject property for the "like" clause token, data for the "you" actor token and the conjunction "Tom and the Royal Bank of Canada". The system can assign, as a subject property for the "said" clause token, data for the conjunction as an object: "Tom and the Royal Bank of Canada".

The system provides, for use by a semantic system, a textual representation of the phrase for the token and the phrases for one or more of the child tokens assigned to one of the one or more properties of the token (280). The textual representation can be a nested triple representation. In some examples, the system can provide a textual representation of the phrase for the token and the phrases for each of the child tokens. The textual representation can be of a subject-predicate-object relationship between the phrase for the token and the phrases for the child tokens. The system can convert some of the subject-predicate-object relationships to a textual representation or to a knowledge graph. For example, if the relationship is Rob; is; our teacher, then the textual representation may be "Rob is our teacher." The knowledge graph may include a node for "Rob" and node for "our teacher." The connection from "Rob" to "our teacher" may include the label "is".

The order of steps in the process 200 described above is illustrative only, and the information extraction can be performed in different orders. For example, the system can generate the dependency parse prior to or concurrently with the determination of the shallow linguistic features.

In some implementations, the process 200 can include additional steps, fewer steps, or some of the steps can be divided into multiple steps. For example, the system can perform steps 250 through 280 without performing the other steps in the process 200.

In more detail, an information extraction tool can extend information extraction structures to facilitate the preservation of more granular pieces of information, e.g., compared to prior systems. The information extraction structures can be consumed in downstream semantic applications such as knowledge graph construction, inference engines, or both. For this, the information extraction tool can transform syntactically complex sentences into multiple tree-like clause-mediated structures which represent the semantic relationships present within the sentence. The information extraction tool can label participants of relationships, e.g., tokens represented by nodes in the tree-like structure, by the semantic role which they represent. The information extraction tool can modify and generate data that indicates relationships between tokens. As a result, the information extraction tool is able to represent the information present within the unstructured sentence in a rich and expressive structure, e.g., using tokens that represent the tree-like structure.

Information extraction is the task of transforming an input sentence into a structured representation of the information present within that sentence by expressing semantic relations between words in the sentence, e.g., arguments, as propositions. An information extraction tool can be an open information extraction tool in the sense that it is not limited to a predefined set of relations. Instead, the information extraction tool can detect the relations joining arguments from the words present within the input sentence. These relationships are conventionally expressed as a triple of arguments such that the first argument represents the clausal subject, the second argument represents the predicate and the last argument represents the clausal object. For example, given the sentence "I wrote a paper," a semantic relationship expressed as a triple <I; wrote; a paper;> may be extracted.

In some implementations, the information extraction tool may have an output structure that includes the aforementioned triple format with minor deviations. In some implementations, the information extraction tool can generate multiple output structures based on a single unstructured sentence, e.g., the information extraction tool can detect two or more relationships in the unstructured sentence and generate one output structure for each relationship. The relationship can be of a predetermined type, e.g., represented by a clause token and one or more properties for the clause token. In some implementations, the information extraction tool may have an output in a pseudo-standardized form that affects analysis by downstream applications.

In some instances, arguments of relations, e.g., words for an unstructured sentence, span across a complex set of sub-relations. Without a canonicalized structure for these sub-relations, downstream applications may have varying success being able to parse the relationships hidden within these long arguments. For example, "I sold the book that she bought" may result in a proposition <I; sold; the book that she bought;>. A downstream application may have varying success in identifying the "bought" relationship between "she" and "the book" without further decomposition of that third argument.

In some instances, one proposition may be related to another. For example, "If you drove a car, you should pay" results in two extracted propositions: <you; drove; a car;> and <you; should; pay;>. The conditional relationship between the two clauses may be missing in the output structures resulting in missing relationships for downstream consumers.

In some implementations, information extraction tool may have a different extraction structure. The new structure can build upon other annotation styles by incorporating two new design principles. First, the structure can preserve, convey, or both, inter-proposition relationships. Second, the structure can express relationship participants in the smallest atomic chunks of meaning, convey sub-relationships as well as modifying properties if appropriate, or both. The information extraction tool discussed in this document can leverage a dependency parse and produce an extraction using this structure by leveraging a rules-based approach, or any other appropriate approach.

In some implementations, an information extraction tool may use a triple proposition format and define the open information extraction field as a variant of traditional information extraction. In some implementations, an information extraction tool may use an example of a rules based system. In some implementations, an information extraction tool may leverage a rule set over universal dependency parses.

In some implementations, an information extraction tool can leverage a dependency parse and extracts propositions based on a set of clause-based patterns. These patterns can result in propositions that are more complex than a standard triple incorporating indirect objects, adjectival modifiers and clausal objects. In some implementations, an information extraction tool allows for additional arguments for numerical data within relationships.

In some implementations, an information extraction tool captures inter-proposition relationships by denoting attributions and clausal modifiers by detecting patterns within dependency parses. In some implementations, an information extraction tool captures such inter-propositional information which learns nested triple representations, e.g., as a complex extraction data structure, over dependency parses allowing for structures such as <<arg; rel; arg>; rel; arg> represented in the output by referring to each other's proposition identifiers. In some implementations, an information extraction tool annotates extracted propositions with additional information including attributions.

The output structure of the information extraction tool can be formally defined as a set of propositions representing explicitly stated and syntactically implied verb-mediated relationships present within the sentence. The verb-mediated relationships can be represented by formatting a triple as a triple of <subject; predicate; object;>. The first and last arguments of the triple may refer to other triples. The last argument may be optional when describing object-less actions such as "John dreams." In cases when the first argument is missing, the triple may not be considered a valid clause but could be referenced by other triples as a verb phrase.

Directly modifying relationships such as colors and determiners can be attributed to any of the arguments in the format <subject (modifier 1, modifier 2 . . . ); predicate . . . >. Describing relationships that modify an argument in relation to another argument may be expressed as <subject [descriptor—other element, . . . ]; predicate . . . >. If the other element in a describing relationship is a clause or verb phrase, then the descriptor may simply refer to the clause, such as <subject [descriptor_clause, . . . ]; predicate . . . >. Both modifying and describing relationships may be attributed to any argument in a triple. All explicitly stated relationships may be extracted.

The information extraction tool can extract syntactically implied relationships such as relative clauses which dependency parsers are able to identify. This may be different from semantically implied relationships that rely on the knowledge of meanings of individual proposition arguments. A semantic inference engine is one example of a downstream processing system that can process data output by the information extraction tool.

This structure can be represented technically by a set of uniquely identified output objects that relate to each other by referencing each other's unique identifier. Each of these elements can represents a particular semantic role within the sentence, be associated with different functions and parameters, or both. Types for the elements can include one or more of the following: token, actor, modifier, descriptor, clause, conjunction, or a combination of two or more of these.

A token can be a single linguistic token associated with a dependency label and part-of-speech label. A token can represent a single word or phrase from an unstructured sentence. In some examples, every word in the sentence and any words referred to by the other elements can appear on a token list.

An actor can be a word or phrase that represents a non-clausal participant of some relationship. A modifier can be a word or phrase that represents an element which directly modifies some other element. A descriptor can be a word or phrase that represents a supplementary relationship that describes an element in relation to another element. A clause can be a word or phrase that represents a clausal relationship or action between or involving one or more participants, e.g., a verb. A conjunction can be a word or phrase that represents an abstraction of a collection of elements that acts as a single element.

For the example sentence, "Rob, our teacher, said in the class, that you like Tom and Eric," each element, e.g., individual word in the sentence, is a token. The information extraction tool can detect, as actors, the collection of nouns from the sentence: "Rob", "teacher", "class", "you", "Tom", and "Eric". The information extraction tool can detect, as modifiers, the determiner of "the" and the possessive modifier of "our". The information extraction tool can detect, as a descriptor, "in" which has the target of "class" representing the prepositional relationship. The information extraction tool can detect a conjunction joining "Tom" and "Eric". Based on this data, the information extraction tool can detect two clauses in the sentence: <you; like; Tom and Eric;> which functions as the object of the larger clause of <Rob; said [in—class (the)]; <you; like; Tom and Eric;>>.

Each element type in the structure used by the information extraction tool is also associated with a particular set of properties. These properties can be predefined in the structure, e.g., in a corresponding token structure, and represent the different interactions a particular element instance has with other elements. Clauses can have the properties of subject and object which refers to the elements that function has the clausal subject and object. Clauses can have a property for an indirect object should there be a secondary object. Actors can have an alias property which refers to an alternate actor that could act in place of this actor. Descriptors can have a property of target which refers to the other element for which the descriptor is describing a supplementary relationship. Conjunction elements can have properties for a list of conjuncts which the conjunction contains, for a conjunction coordinator token if applicable, or both.

In some examples, all actors, modifiers, descriptors, clauses, or a combination of two or more of these, can include a property for the token the element represents as well as a list of modifiers and descriptors that might influence them. For instance, the information extraction tool can have an actor token that includes one or more actor properties and references another token that represents the corresponding word or phrase for the actor. In some implementations, the information extraction tool can have a single actor token that includes, as one of its properties, the corresponding word or phrase for the actor.

In some implementations, the information extraction tool can be configured to prevent cyclical structures. For instance, the information extraction tool can have one or more rules that prevent the information extraction tool from creating cyclical structures in which one element refers to another element which refers to the original element.

In some examples, if properties of a particular element are thought of functioning as children of that element, then the resulting structure resembles a forest of trees. Each tree is such that clauses form the root which then refers to other elements in a hierarchical manner.

Given some input English sentence, the information extraction tool can process the sentence in a series of stages. The stages can feed into each other sequentially such that they transform their input representation into some output representation for the next stage.

Given a sentence, the information extraction tool can prepare the text for processing by first finding and removing all text wrapped in parenthesis. The information extraction tool can expand any contractions, e.g., common English contractions or contractions for the respective language, the information extraction tool finds such as "it's" or "could've" into "it is" and "could have", respectively. This can reduce an amount of noise present within the input sentence from parenthetical arguments and disbanded contractions, improving the accuracy of the information extraction tool. The resulting processed sentence can then pass through a dependency parser.

The information extraction tool can leverage a dependency parser. Based on the preprocessed sentence, the dependency parser can extract the dependency parse of the sentence. The information extraction tool may include or access a module for tokenization. This module may support various dependencies and part-of-speech labels.

The extracted dependency parse can be a tree of tokens, e.g., such that each token is associated with a dependency and a part-of-speech token. Each token could have multiple children and a single parent, except for the root token. The root token can represent a root relationship expressed in the sentence, e.g., a root or primary verb.

The information extraction tool maps some dependency and part-of-speech labels based on certain conditions. The information extraction tool can map some labels to a more generalized label. The information extraction tool can perform this specific to generalized label mapping upon determining that the fine-grained labels are unnecessary as they functionally represent the same element in the final output. For example, the information extraction tool maps proper noun and symbol part-of-speech labels to a simple, generalized noun part-of-speech.

The information extraction tool can map some labels to more accurate labels. In these cases, the information extraction tool can determine that a more fine-grained disambiguation is needed when the tokens will become different elements depending on their labels. For example, noun phrase adverbial modifiers are mapped to be a noun subject if it has a verb or adverb parent but does not have a noun subject sibling. In some implementations, noun phrase adverbial modifiers may be mapped to be a direct object if it has a verb parent, it does have a noun subject sibling but does not have a direct object sibling.

The result of this stage can be a dependency parse with corrected or modified labels that will ease downstream processing and reduce overall error.

Within a sentence, there may be entities. An entity can be a phrase for which multiple tokens, e.g., words, collectively name a "thing." An example of an entity is "the Royal Bank of Canada" when the information extraction tool initially has separate tokens for each word in this phrase. The information extraction tool can use any appropriate process to recognize entities, e.g., custom or generalized processes.

The information extraction tool can filter out candidate entities so that they represent supersets of tokens. For instance, if one identified entity is contained within another entity, the information extraction tool can use the larger of the two entities; if two entities overlap, the information extraction tool can use the combination, e.g., the conjunction, as the entity.

For each entity, the information extraction tool can determine the corresponding tokens within the dependency tree. If a verb or auxiliary token is found at the beginning or end of an entity, those tokens are no longer considered within that entity. For instance, when each entity references data for one or more tokens, the references to a verb token, an auxiliary token, or both, are removed from the entity when the verb token, the auxiliary token, or both, are at the beginning or the end of the entity.

Each token can only belong to zero or one entity. Tokens that are contained within an entity can all be merged into a single token. Therefore, the dependency tree output of this stage may contain tokens which include phrases, e.g., with one or more words.

The information extraction tool can check for detectable dependency errors to reduce propagated errors. The information extraction tool can apply a collection of checks based on the dependency structure. For example, if a tree does not have a verb as its root, the information extraction tool can determine that the tree is invalid. The information extraction tool might not process invalid trees and might generate an invalid dependency error. If a tree has a verb at its root, the information extraction tool can determine that the tree is valid.

When a dependency tree is validated, the information extraction tool can iterate through all tokens in the dependency tree to identify tokens as clauses, actors, descriptors, and modifiers. The information extraction tool can use identification criteria based on each token's dependency, part-of-speech and the dependency and part-of-speech parameters of its parents and siblings, if any.

This can enable the information extraction tool to map the tokens in the dependency tree to sets of elements in the structure. For example, given the sentence "I wrote a paper", the information extraction tool may have identified the actors of "I" and "paper", modifier of "a" and clause of "wrote" but the information extraction tool may not yet know how these elements connect to each other. To determine how the elements connect to each other, the information extraction tool can use dependency and part-of-speech data. For instance, the information extraction tool can link elements to each other through the properties of the individual elements.

The information extraction tool can iterate through the identified elements. For each element, the information extraction tool can look at the element's children in the dependency tree. Depending on the element type and the child type as well as the child dependency and part-of-speech, the information extraction tool can associate the child with a particular property of the element under examination.

For example, when examining a clause element, if the information extraction tool encounters an actor, as a child token, with a dependency of noun subject, then the information extraction tool can assign data for the actor as the clause's subject, e.g., the clause's subject parameter. Likewise, an actor with a dependency of direct object can be assigned as the clause's object.

During processing, the information extraction tool can create new conjunction elements to contain any element with children that have a conjunction dependency and those children with the conjunction dependency. For example, given a sentence "I like Tom and Eric", "Tom" and "Eric" would be contained in a conjunction element.

The resulting structure can resemble a target output, being sets of interconnected elements forming a forest of trees rooted by clause elements. The information extraction tool can perform one or more adjustments on the resulting structure. For instance, after initial processing, the information extraction tool can analyze all elements to make adjustments as needed.

The information extraction tool can resolve all conjunctions to find supersets, such that if multiple conjunctions overlap in elements, they are joined into a single conjunction. The information extraction tool can iterate through all conjunctions to check for adoption needs, e.g., such that a property from one conjunct may be adopted to other conjuncts that do not have that property. For example, for conjunctions of clauses, objects that appear before or after all conjuncts in the conjunction can be adopted to any conjunct that does not have an object.

In some implementations, at this stage, the information extraction tool has a valid structure representing the explicitly stated relationships in the input sentence. The information extraction tool can apply a level of post-processing to extract implicit relationships as well.

With explicit relationships in hand, the information extraction tool can identify syntactically implied relationships. These relationships may be marked by specific dependency structures and might not require semantic understanding of the words by the information extraction tool.

The information extraction tool can iterate through the elements to identify these implicit relationships by examining the element type, dependency and part-of-speech label as well as the properties of the element. For any identified implied relationships, the information extraction tool can create new clause elements to capture these relationships. For example, for the unstructured sentence "I sold the book that you bought", the information extraction tool can generate an additional clause <you; bought; the book> derived from the relative clause structure. In some examples, the information extraction tool might only extract syntactically implied relationships.

After post-processing, the collected elements can be ready for output. Although all clauses may be treated the same during processing, depending on their structure, they may represent different "flavors" of clauses, such as fact, derived fact, sub fact, or verb phrase. A fact can be a clause that was not derived in a postprocessor and is not referenced by any other clause. A derived fact can be a clause that was created in post-processing thus representing a syntactically implied relationship. A sub fact can be a clause that is referenced by another clause and also has a subject property. A verb phrase can be a clause that does not have a subject property.

As an example, the information extraction tool may analyze the sentence, "I read the book you like." Identification would find actors of "I", "book", "you", modifier of "the", clauses of "read" and "like". During processing, "the" would be identified as the determiner modifier of "book". For "read", "I" would be the subject, "book" would be the object. For "like", "you" would be the subject. During post-processing <you; like; book (the)> would be derived from the relative clause. The final output would involve <I; read; book (the) [<you; like;>]> and the derived clause of <you; like; book (the);>.

The information extraction tool can provide the final output to any appropriate downstream system. For instance, the information extraction tool can provide the final output to one or more knowledge graph constructors which can construct a canonicalized knowledge representation based on the extracted propositions. The information extraction tool can provide the final output to an inference engine that extracts semantically implied relationships based on extracted propositions are also of great interest.

Figure 3:
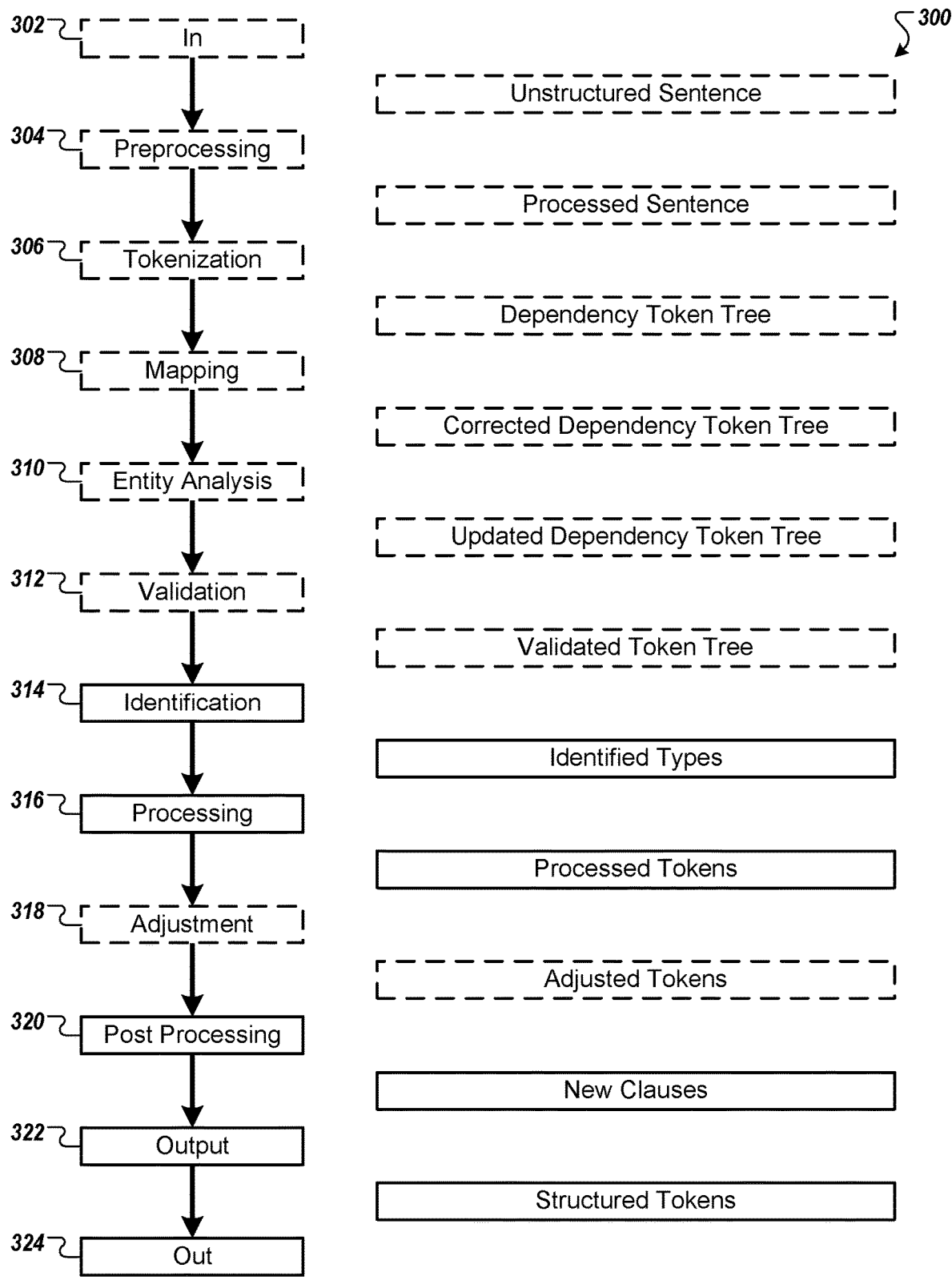
FIG. 3 is a swim lane diagram of a process for information extraction.

FIG. 3 is a swim lane diagram of a process 300 for information extraction. A system can use the process 300 to generate a textual representation of a phrase, e.g., a final output. For example, the process 300 can be used by an information extraction tool, such as the natural language processing system 102 from the environment 100.

The information extraction tool receives, as input, data that represents an unstructured sentence (302). The unstructured sentence can be raw in that it was not previously analyzed by an information extraction tool. The unstructured sentence can be based on user input, such as input with a keyboard or a microphone. The unstructured sentence can be "Rob, our teacher, said in class that you like Tom and Eric" or "Rob, our teacher, said in class that you like Tom and the Royal Bank of Canada."

The information extraction tool generates a processed sentence by preprocessing the unstructured sentence (304). For instance, the information extraction tool can find and remove all text wrapped in parenthesis, expand contractions, e.g., based on an internal list of common English contractions, or both. For the example sentence: "SoftBank (known for its investment in WeWork) announced its Vision Fund in 2016, but didn't invest all of the Fund that year", the preprocessed output could be "Softbank announced its Vision Fund in 2016, but did not invest all of the Fund that year."

The information extraction tool generates a dependency token tree by tokenizing the sentence (306). For example, the information extraction tool can tokenize the unstructured sentence, when it doesn't perform the preprocessing step 304, or tokenize the processed sentence.

The dependency tree can include tokens and linguistic labels. The information extraction tool can tokenize and linguistically label the sentence by identifying: atomic words/pieces, e.g., tokens, linguistic dependencies between tokens, a part-of-speech for each token, or a combination of two or more of these.

The dependency token tree can be a structure that is a tree of tokens, e.g., such that, each token is associated with a dependency and a part-of-speech token. Each token can have zero or more children and a single parent, except for the root token. The root token has one or more children. The leaf tokens in the dependency token tree have no children. The root token can represent the root relationship expressed in the sentence and can be, but need not be, a verb. In this document, dependency labels can be expressed in capitalized letters such as AMOD, and part-of-speech labels can be expressed in underlined capital letters such as NOUN.

The information extraction tool can assign, to the root of the dependency token tree, the token which does not have a parent. The information extraction tool can assign to the root the dependency of ROOT. For example, for the sentence "Rob, our teacher, said that you like Tom and Eric", the information extraction tool can obtain the dependency tree 108, depicted in FIG. 1. In the dependency tree 108, each arrow can represent a parent-child relationship such that the arrow side is the child. The word "said" would be assigned a dependency of ROOT as it is the root of this tree.

In some examples, the information extraction tool can generate the dependency tree as shown in Table 1, below. In Table 1, each indent represents a parent-child relationship such that the indented item is a child of the level above.

TABLE 1 example dependency tree said index=1.0 dep=ROOT pos=VERB
- rob index=0.0 dep=NSUBJ pos=NOUN
- like index=4.0 dep=CCOMP pos=VERB
  - that index=2.0 dep=MARK pos=MARK TABLE 1-continued example dependency tree

- you index=3.0 dep=NSUBJ pos=PRON
- tom index=5.0 dep=POBJ pos=NOUN
  - and index=6.0 dep=CC pos=CC
  - eric index=7.0 dep=CONJ pos=NOUN The information extraction tool generates a corrected dependency token tree by mapping one or more first labels to one or more corresponding second labels (308). For instance, the information extraction tool can convert some labels to more general labels, convert some labels to alternative labels, or both. This can improve an accuracy of the information extraction tool, e.g., by correcting some detectable errors.

In some examples, the information extraction tool can map the dependency relationships shown in Table 2, below. The information extraction tool can map part-of-speech tags as shown in Table 3, below.

TABLE 2 dependency relationship mapping

| Tokenization Module Tag | Mapped Tag |
|---|---|
| ACL | VMOD |
| CASE | PS |
| COMPOUND NMOD | NN |
| INTJ | DISCOURSE |
| NUMMOD | NUM |
| OPRD | ACOMP |
| PUNCT | P |
| RELCL | RCMOD |
| QUANTMOD | DET |
| AGENT | PREP |

TABLE 3 part-of-speech mapping

| Tokenization Module Tag | Mapped Tag |
|---|---|
| PROPNSYM | NOUN |
| CCONJ | CC |
| SCONJ | MARK |
| PART | PRT |
| AUX | VERB |

In some implementations, the information extraction tool performs mapping using one or more contextual rules. Table 4, below, includes some example contextual rules, one or more of which the information extraction tool can use in a mapping process.

TABLE 4 example contextual rules

| Condition | Output | Examples |
|---|---|---|
| AMOD and ACOMP tokens which has a child token marked as NSUBJ or DOBJ | Map to VMOD | For:<br>open-sourcing index = 11.0 dep = ACOMP pos = VERB<br>codecs index = 14.0 dep = DOBJ pos = ADJ<br>its index = 12.0 dep = POSS pos = DET<br>h.264 index = 13.0 dep = NN pos = NOUN<br>The information extraction tool can map the dependency relationship for "open-sourcing" to VMOD |

TABLE 4-continued example contextual rules

| Condition | Output | Examples |
|---|---|---|
| NPADVMOD token representing a time-centric word as determined by an internal list of time-centric words (A.5) | Map to TMOD | For:<br>year index = 7.0 dep = NPADVMOD pos = NOUN<br>that index = 6.0 dep = DET pos = DET<br>The information extraction tool can map the dependency relationship for "year" to TMOD |
| NPADVMOD with a VERB or ADV parent but does not have NSUBJ sibling | Map to NSUBJ | For:<br>Dave index = 0.0 dep = NPADVMOD pos = NONU<br>friend index = 3.0 dep = APPOS pos = NOUN<br>my index = 2.0 dep = POSS pos = DET<br>The information extraction tool can map the dependency relationship for "Dave" to NSUBJ |
| NPADVMOD with a VERB or ADV parent but does not have DOBJ or ATTR sibling | Map to DOBJ | For:<br>hours index = 25.0 dep = NPADVMOD pos = NOUN<br>longer index = 24.0 dep = AMOD pos = ADJ<br>The information extraction tool can map the dependency relationship for "hours" to DOBJ |
| ADVMOD with any NSUBJ or DOBJ children | Map to VMOD | For:<br>ago index = 9.0 dep = ADVMOD pos = ADV<br>years index = 8.0 dep = NSUBJ pos = NOUN<br>The information extraction tool can map the dependency relationship for "ago" to VMOD |
| NSUBJ with VERB | Map to NOUN | For:<br>framing index = 15.0 dep = NSUBJ pos = VERB<br>platform index = 14.0 dep = NN pos = NOUN<br>The information extraction tool can map the part-of-speech for "framing" to NOUN |
| DATIVE with POBJ children | Map to PREP | For:<br>to index = 10.0 dep = DATIVE pos = ADP<br>Tibet index = 11.0 dep = POJ pos = NOUN<br>The information extraction tool can map the dependency relationship for "to" to PREP |
| DATIVE with NOUN or PRON | Map to IOBJ | For:<br>eukaryote index = 4.0 dep = DATIVE pos = NOUN<br>the index = 3.0 dep = DET pos = DET<br>The information extraction tool can map the dependency relationship for "eukaryote" to IOBJ |
| DATIVE that does not have POBJ children or is NOUN or PRON | Map to XCOMP | |
| DEP with DET and parent with VERB | Map to NPADVMOD | For:<br>are index = 13.0 dep = ROOT pos = VERB<br>Plants index = 0.0 dep = NSUBJ pos = NOUN<br>animals index = 2.0 dep = CONJ pos = NOUN<br>fungi index = 4.0 dep = CONJ pos = NOUN<br>moulds index = 7.0 dep = CONJ pos = NOUN fungi index = 4.0 dep = CONJ pos = NOUN<br>slime index = 6.0 dep = NN pos = NOUN<br>protozoa index = 9.0 dep = CONJ pos = NOUN<br>and index = 11.0 dep = CC pos = CC<br>algae index = 12.0 dep = CONJ pos = NOUN<br>all index = 14.0 dep = DEP pos = DET<br>The information extraction tool can map the dependency relationship for "all" to NPADVMOD |
| NOUN with clausal dependency or CONJ with parent that has clausal dependency (A.4) | Map to VERB | For:<br>selling index = 4.0 dep = PCOMP pos = VERB<br>compositions index = 6.0 dep = DOBJ pos = NOUN<br>his index = 5.0 dep = POSS pos = DET<br>and index = 7.0 dep = CC pos = CC<br>teaching index = 8.0 dep = CONJ pos = NOUN<br>The information extraction tool can map the part-of-speech for "teaching" to VERB |

TABLE 4-continued example contextual rules

| Condition | Output | Examples |
| --- | --- | --- |
| MARK with CONJ sibling but no PRECONJ sibling | Map to PRECONJ | For:<br>that index = 6.0 dep = MARK pos = MARK<br>it index = 7.0 dep = NSUBJ pos = PRON<br>open-sourcing index = 11.0 dep = ACOMP pos = VERB<br>codecs index = 14.0 dep = DOBJ pos = ADJ<br>its index = 12.0 dep = POSS pos = DET<br>h.264 index = 13.0 dep = NN pos = NOUN<br>and index = 15.0 dep = CC pos = CC<br>cover index = 17.0 dep = CONJ pos = VERB<br>The information extraction tool can map the dependency relationship for "that" to PRECONJ |
| POBJ with VERB and has NSUBJ or DOBJ children | Map to PCOMP | For:<br>building index = 21.0 dep = POBJ pos = VERB<br>systems index = 24.0 dep = DOBJ pos = NOUN<br>The information extraction tool can map the dependency relationship for "building" to PCOMP |
| POBJ with VERB and does not have NSUBJ or DOBJ children | Map to NOUN | For:<br>Eats index = 9.0 dep = POBJ pos = VERB<br>Uber index = 8.0 dep = NN pos = NOUN<br>The information extraction tool can map the part-of-speech for "Eats" to NOUN |
| DOBJ with MARK | Map to MARK | For:<br>that index = 20.0 dep = DOBJ pos = MARK<br>The information extraction tool can map the dependency relationship for "that" to MARK |
| DET with DET that represents a negative word on an internal list (A.6) | Map to NEG | For:<br>no index = 19.0 dep = DET pos = DET<br>The information extraction tool can map the dependency relationship for "no" to NEG |

In some implementations, the information extraction tool can restructure one or more portions of the dependency tree structure. For example, if a token does not have a PREP parent but does have a CC child and does not have a CONJ child, the information extraction tool can map the token to CONJ and transfer the CC child to be the child of the parent token.

If a series of tokens are connected together via a CONJ dependency, the information extraction tool can reconnect all subsequent CONJ children to the first element in the chain. For the sentence "I like apples, bananas and oranges", the information extraction tool can rearrange the dependency of the fruits, with apples the parent of bananas, and bananas as the parent of oranges, so that apples is the parent of both bananas and oranges, each with the dependency of CONJ.

When the information extraction tool detects a CC and PRECONJ token, the information extraction tool can merge all children of these tokens into the token to form a single token. For the sentence "I like apples as well as bananas," the information extraction tool can merge "as well as" into a single token with the dependency of CC (e.g., when the first "as" originally had a dependency of CC, and the second "as" and "well" had dependencies of ADVMOD).

In some examples, when an AUX or AUXPASS token that is a child of a VERB has ADVCL, CCOMP, NSUBJ, DOBJ children, the information extraction tool can adjust the tree so that those children are children of the VERB parent instead.

The information extraction tool generates an updated dependency token tree by detecting entities represented by a portion of the dependency token tree (310). In the dependency token tree or the corrected dependency token tree, an entity is represented by multiple tokens which collectively name a "thing". These multiple tokens can identify groups of nouns as noun-phrases.

The information extraction tool can use any appropriate process to detect tokens that represent an entity. The information extraction tool can use a tokenization model, a wordlist that identifies tokens for entities, or both.

In some examples, the information extraction tool can determine whether multiple entities, e.g., two or more candidate entities, are detected in a dependency token tree. If so, the information extraction tool can select one or more candidate entities that they represent supersets of tokens. A superset of tokens represents an entity whose tokens include all of the tokens for another entity when the tokens for the two entities overlap. In some examples, when the tokens for the two entities do not completely overlap, e.g., there are some tokens for each entity that are not included in the other entity, the information extraction tool can use, as the superset of tokens, the combination of tokens for both entities as the entity.

For each entity, the information extraction tool can detect the corresponding tokens within the dependency token tree. If a VERB or AUX token is found at the beginning or end of an entity, the information extraction tool can select the other tokens for the entity, e.g., and not the VERB or AUX token at the beginning or end of the entity. In some examples, each token can only belong to a maximum of one entity.

For tokens that are contained within an entity, the information extraction tool can merge the tokens into a single token. The information extraction tool can use, for the new single token, the dependency and part-of-speech information from the first entity token by order in the sentence that is a NOUN or ADJ. For example, for the sentence "I like the Royal Bank of Canada, the information extraction tool can merge the tokens for the individual words in "Royal Bank of Canada" into a single token as it is an entity representing the single concept of a bank.

The information extraction tool can generate a validated token tree by validating the dependency token tree (312). The information extraction tool can validate the dependency token tree, the corrected dependency token tree, or the updated dependency token tree. For instance, the information extraction tool may ensure the dependency tree has the correct structure. The information extraction tool can validate a dependency token tree using any appropriate process, e.g., by applying one or more rules to determine whether the dependency token tree is valid.

Some rules can check to determine whether: 1) the root token is not a VERB; 2) an NSUBJ, NSUBJPASS, DOBJ, ATTR token does not have NOUN, PRON, DET, ADJ, NUM part-of-speech, or the parent of this token is a NOUN; 3) NN token has a VERB parent and the parent is not NSUBJ or DOBJ; 4) XCOMP that is not VERB or has a NSUBJ child; 5) CONJ token that has a parent with a different part-of-speech; or 6) DEP detected. If any of these rules is true, the information extraction tool can determine that the dependency token tree is invalid.

Upon determining that the dependency token tree is invalid, the information extraction tool can stop processing data for the unstructured sentence, e.g., stop performing the process 300. Upon determining that the dependency token tree is valid, the information extraction tool can continue processing data for the unstructured sentence, e.g., continue to step 314.

The information extraction tool identifies one or more token types, element types, or both, for the tokens in the dependency token tree (314). For instance, the information extraction tool can iterate through all tokens in the dependency token tree to identify tokens as clauses, actors, descriptors and modifiers as appropriate.

The information extraction tool can identify a clause token as a token that has a dependency relationship of ADVCL, CCOMP, CSUBJ, CSUBJPASS, PCOMP, RCMOD, XCOMP, VMOD, or ROOT. The information extraction tool can identify an actor token as a token that has a dependency relationship of APPOS, NSUBJ, NSUBJPASS, DOBJ, IOBJ, POBJ, EXPL, ATTR, ACOMP, or TMOD; a part-of-speech as NOUN or PRON; or a token with a dependency label of NUM or POSS without a NOUN parent. In some examples, an actor token cannot have a dependency label of NN, CONJ, NPADVMOD, RCMOD, or ADVMOD; a dependency label of TMOD if NOUN without a VERB parent; or a dependency label of AMOD if parent is PREP.

The information extraction tool can identify a descriptor token as a token that has a PREP dependency relationship with one or more children. The information extraction tool can identify a modifier token as a token that has a dependency relationship of ADVMOD, NPADVMOD, AUX, AUXPASS, NEG, PRT, or PS; a dependency relationship of PREDET without any CONJ siblings; a dependency relationship of TMOD without VERB parents; a dependency relationship of NUM without NUMBER parents; or a dependency relationship of AMOD without PREP parents.

The information extraction tool determines relationships between the tokens by processing the identified types (316). For instance, the result of the identification stage might be a coarse representation of the structure of the sentence in that the information extraction tool may not yet know how the elements relate to each other.

The information extraction tool can iterate through the tokens in the dependency token tree and determine whether the child tokens of the token should be merged with the token, whether to update a property of the token using data for a child token, or both. In some examples, the information extraction tool either merges a child token with a parent token or updates a property of a parent token using data for the child token. For instance, the information extraction tool can merge MWE, MARK, AUX children tokens with a parent clause token. If clause is VMOD, the information extraction tool can merge ADVMOD children with the parent clause token. If clause is ADVCL, the information extraction tool can merge PRT children with the parent clause token. The information extraction tool can MARK children to become the clause's introduction.

In some implementations, for NSUBJ or NSUBJPASS children tokens, if a clause parent token is RCMOD or the child is PRON which starts with "wh", the information extraction tool can make the child token the clause's introduction. If not, and the clause token does not already have a subject, the information extraction tool can make the child token the clause's subject. If not and the clause token already has a subject, the information extraction tool can make the child token the existing subject's alias. For a "makes" clause parent token, with a "that" child token, the information extraction tool can make "that" the introduction of "makes".

In some implementations, for DOBJ, ATTR, POBJ, or ACOMP children, if clause token is RCMOD or the child token is PRON or DET which starts with "wh", the information extraction tool can make the child token the clause's introduction. If not, and the clause parent token does not have an object, the information extraction tool can make the child token the clause's object. If not, and the clause parent token already has an object, the information extraction tool can make the child token the existing object's alias. For a "combine" clause parent token, with a "which" child token, the information extraction tool can make "which" introduction of "combine".

In some implementations, the information extraction tool can make EXPL children tokens the subject if a clause token does not have another subject. The information extraction tool can make EXPL children tokens the object if the clause token does not have another object. For an "are" clause parent token, with a "there" child token with a dependency relationship of EXPL, the information extraction tool can make the "there" child token the subject of the "are" clause parent token.

In some implementations, the information extraction tool can make IOBJ child tokens a clause's indirect object. The information extraction tool can make TMOD child tokens a clause's time modifier. The information extraction tool can make CSUBJ, or CSUBJPASS child tokens will be a clause's subject. The information extraction tool can make XCOMP children a clause's descriptor. The information extraction tool can make CCOMP children a clause's descriptor if the clause does not have an object. The information extraction tool can add descriptor children to a clause's descriptor list.

The information extraction tool can make ADVMOD modifiers that start with "wh" and come before the clause the clause's introduction if the clause is ADVCL. For a "compared" clause parent token, with an index of 11.0 and a "when" child token that has an index of 10.0, the information extraction tool can make "when" the introduction.

In some examples, the information extraction too can add all unaccounted-for modifiers to a clause's modifier list. The information extraction tool can merge PREP children without children of their own into a clause parent token. For instance, given the above example with the clause of "said", the information extraction tool can make "rob" the subject, add "in" as a descriptor and make "like" the object. For the clause of "like", the information extraction tool can make "you" the subject, and "tom and eric" the object.

For each actor, the information extraction tool can merge NN, NUMBER, TITLE, SUFFIX children with an actor parent token. If the actor is NUMBER and child is NUM, then the information extraction tool can merge the child with the actor. The information extraction tool can make DET children as the actor's determiner. The information extraction tool can make PREDET children as the actor's determiner if it is not set yet, otherwise add it as actor's modifier.

The information extraction tool can make POSS children as the actor's possession. The information extraction tool can make actor children as the actor's alias. The information extraction tool can make modifier children as the actor's modifier. The information extraction tool can make descriptor children as the actor's descriptor. The information extraction tool can make clause children as the actor's descriptor. For instance, given the above example, for the actor of "rob", the information extraction tool can make "teacher" an alias of "rob". For the actor of "teacher", the information extraction tool can make "our" a modifier of "teacher".

For each modifier, the information extraction tool can merge NUM, NUMBER, ADVMOD, CONJ, NN, DET, NUMBER children into a modifier. The information extraction tool can make clause children as a modifier's descriptor. The information extraction tool can make descriptor children as a modifier's descriptor. For instance, the information extraction tool can make "in Canada" a descriptor on the modifier "anywhere".

For each descriptor, the information extraction tool can make modifier children as a descriptor's modifier. For example, the information extraction tool can make an "even" child token become a modifier on the descriptor "in" parent token. The information extraction tool can make descriptor children as a descriptor's descriptor. For example, the information extraction tool can make a "for" child token a descriptor on the descriptor "from" parent token.

The information extraction tool can make POBJ, PCOMP or NOUN, ADJ children as a descriptor's target. For the descriptor of "in", the information extraction tool can make "class" the target.

The information extraction tool can merge MWE, NPADVMOD, DET and MARK children into a descriptor. For instance, the information extraction tool can merge the child descriptor "ten years" with the parent descriptor "after".

In some examples, for all elements, when encountering CONJ children, the information extraction tool can create a new conjunction object to contain that element along with all its CONJ children. When encountering PRECONJ children, the information extraction tool can make the PRECONJ children as the new conjunction element's pre property. The information extraction tool can mark CC children as the conjunction's coordinator. Given the above example, the information extraction tool can create a conjunction from "tom" and "eric" such that the two actors are the conjuncts and "and" would become the coordinator.

The information extraction tool can adjust one or more of the tokens (318). For example, after initial processing, the information extraction tool can analyze one or more of the tokens, e.g., all the tokens, for conjunctions. The information extraction tool can adjust one or more conjunctions, e.g., using data for another conjunction or data for the conjunction.

The information extraction tool can resolve any conjunctions to find supersets, such that if multiple conjunctions overlap in elements, they are joined into a single conjunction. The information extraction tool can iterate through all conjunctions to check for adoption needs, e.g., when a property (referred to as the adoptee) from one conjunct may be adopted to other conjuncts (each referred to as the adopters) that do not have that property.

The information extraction tool can adjust clause conjunctions by adopting introductions that come before all conjuncts or after all conjuncts. For instance, the information extraction tool can cause a second conjunct clause "becoming" to adopt the introduction "that" from the first clause "followed".

The information extraction tool can adjust clause conjunctions by adopting subjects that are closest by order in the sentence to the adopter. For example, the information extraction tool can cause a second clause "saw" to adopt the subject of a first clause "considered" which is "he" so the information extraction tool gets "he always saw himself as a pole".

The information extraction tool can adjust clause conjunctions by adopting objects that come before all conjuncts or after all conjuncts, if the adopter does not have any descriptors, or the descriptors it does have come after all conjuncts. For example, the information extraction tool can cause a second clause "killing" to adopt object of a first clause "wounding".

The information extraction tool can adjust clause conjunctions by adopting modifiers that come before the adopter, if the adopter and conjunct to adopt from have the same subject (even if it's no subject) and the same tense. The information extraction tool can cause this adjustment when the adopter does not have ADVMOD, AUX, AUXPASS, NEG modifiers and the adoptee is NEG. The information extraction tool can cause this adjustment when the adopter does not have ADVMOD, AUX, AUXPASS modifiers and the adoptee is AUX or AUXPASS. For example, the information extraction tool can cause a second clause "replaced" to adopt the modifier "was" from a first clause "removed".

The information extraction tool can adjust clause conjunctions by adopting descriptors that are VMOD without a target when the adopter does not have any descriptors and the adoptee comes after the adopter. The information extraction tool can adjust clause conjunctions by adopting descriptors that are ADVCL and come before the both the adopter and original conjunction, or after both the adopter and original conjunction and adopter does not have any ADVCL descriptors. For the sentence "I like and eat apples", there are two clauses in a conjunction: "like" and "eat". "like" has the subject of "I" but no object, "eat" has the object of "apples" but no subject. Based on adoption rules defined, the information extraction engine can cause "like" to adopt the object of "apples" and "eat" to adopt the subject of "I" forming two full clauses.

The information extraction tool can adjust actor conjunctions by adopting descriptors if adopter does not have any descriptors and the descriptor comes after the conjunct and adopter. The information extraction tool can adjust actor conjunctions by adopting a determiner if adopter doesn't have ADVMOD modifier. The information extraction tool can adjust actor conjunctions by adopting a possession if the adopter is not DET. For the sentence "I like circles and squares in the design" there are two actors "circles" and "squares" that are in a conjunction. Only "circles" would have the descriptor of "in". Based on adoption rules defined, the information extraction engine can cause "squares" to adopt the descriptor of "in" forming "circles in the design" and "squares in the design".

The information extraction tool can adjust descriptor conjunctions by adopting targets if the conjunct does not have descriptors or modifiers and the target is after both the conjunct and adopter. For the sentence "I read of and in the book", there are two descriptors "of" and "in" that are in a conjunction. Only "in" has the target of "book". Based on adoption rules defined, the information extraction tool can cause "of" to adopt "book" as the target as well.

The information extraction tool can generate one or more new clauses (320). For instance, after the set of tokens is finalized, the information extraction tool can create new clauses based on the information in and structure of the tokens in the dependency token tree.

For actors with aliases, the information extraction tool can create an "is" clause such that the subject is the actor and the object is the alias. If the actor is plural and the alias is a conjunction, the information extraction tool can create an "are" clause instead with the same subject and object. For instance, based on the above example, with the actor "rob" that has the alias of "teacher"; the information extraction tool can create a new clause with "rob" as the subject and "teacher" as the object representing the idea of "rob is our teacher".

For clauses with a conjunction as a subject or object, the information extraction tool can determine multiple permutations, e.g., all or nearly all, between each conjunct combination. The information extraction tool can mark each new clause created from a conjunction combination as a derived clause of the original clause. For the example sentence "Tom and Bill visited Rome and Naples", based on the conjunctions, the information extraction tool can determine new clauses that represent the ideas of "tom visited Rome", "tom visited Naples", "bill visited Rome", "bill visited Naples".

When an actor has a descriptor with a target of RCMOD and the RCMOD clause has a subject of DET or PRON that starts with "wh", the information extraction tool can create a new clause such that all properties of the clause remain the same as the RCMOD clause except the subject is changed to the actor. When an actor has a descriptor with a target of RCMOD and the RCMOD clause has an object of DET or PRON that starts with "wh", the information extraction tool can create a new clause such that all properties of the clause remain the same as the RCMOD clause except the object is changed to the actor. When an actor has a descriptor with a target of RCMOD and the RCMOD clause has a descriptor with an actor target that is DET or PRON that starts with "wh", the information extraction tool can create a new clause such that all properties of the clause remain the same as the RCMOD clause except the relevant descriptor's target is changed to the actor. For the example sentence of "I sold the book which you bought", the actor of "book" has the descriptor clause of "which you bought", so the information extraction tool can replace "which" with "book", forming a new clause with "you" as the subject and "book" as the object representing the idea of "you bought the book."

For clauses with descriptors that have conjunction targets, the information extraction tool can determine permutations, all or nearly all, involving each conjunction target. For the example sentence of "I read at the library and school", the descriptor of "at" has a conjunction of actors, "library" and "school", as the target. The information extraction tool can create two new clauses representing the ideas of "I read at the library" and "I read at the school".

For any clause with an actor as a subject or object that also has an alias, the information extraction tool can create a new clause such that all properties remain the same as the original clause except the information extraction tool swaps out the alias. For example, given the above sentence, because "rob" has the alias of "teacher", the information extraction tool can create a new clause replacing "rob" with "teacher", representing the idea of "our teacher likes apples".

The information extraction tool generates one or more structured tokens using the new clauses (322) and provides the structured tokens as output (324). The structured tokens can be nested triple representations. The information extraction tool can provide the structured tokens to a downstream system, such as a knowledge graph, an inference engine, or both.

After post-processing, the collected elements can be ready for output. Although all clauses may be treated the same during processing, depending on their structure, they may represent different "flavors" of clauses, such as fact, derived fact, sub fact, or verb phrase. A fact can be a clause that was not derived in a postprocessor and is not referenced by any other clause. A derived fact can be a clause that was created in post-processing thus representing a syntactically implied relationship. A sub fact can be a clause that is referenced by another clause and also has a subject property. A verb phrase can be a clause that does not have a subject property.

Given the above example of "Rob, our teacher, said in the class, that you like Tom and Eric", some facts include: "Rob is our teacher" and "Rob said that you like Tom and Eric in the class". Derived facts, from the conjunction and the alias, include: "Our teacher said that you like Tom in the class" and "Our teacher said that you like Eric in the class." Derived facts, from the conjunction, include: "You like Tom"; "You like Eric"; "Rob said that you like Tom in the class"; and "Rob said that you like Eric in the class." An example derived fact from the alias includes "Our teacher said that you like Tom and Eric in the class." A sub-fact includes "You like Tom and Eric."

The order of steps in the process 300 described above is illustrative only, and generating a textual representation of a phrase can be performed in different orders. For example, the information extraction tool can validate the dependency token tree prior to performing entity analysis, e.g., step 310.

In some implementations, the process 300 can include additional steps, fewer steps, or some of the steps can be divided into multiple steps. For example, the process 300 can include steps 314, 316, 320, and 322, without the other steps in the process. In some implementations, the process 300 can include steps 314, 316, 320, and one or more of steps 302, 304, 306, 308, 310, 312, 318, 322, or 324.

Specifically, with reference to the unstructured sentence: "Rob (his English name), our teacher, said in the class, that you like Tom and the Royal Bank of Canada.", preprocessing would remove the parenthesis, resulting in "Rob, our teacher, said in the class, that you like Tom and the Royal Bank of Canada." Tokenization would result in the dependency tree shown in Table 5, below.

TABLE 5 dependency tree said index=5.0 dep=root pos=verb
- Rob index=0.0 dep=nsubj pos=propn
  - , index=1.0 dep=punct pos=punct
  - teacher index=3.0 dep=appos pos=noun
    - our index=2.0 dep=poss pos=det
- , index=4.0 dep=punct pos=punct
- in index=6.0 dep=prep pos=adp
  - class index=8.0 dep=pobj pos=noun
    - the index=7.0 dep=det pos=det
- , index=9.0 dep=punct pos=punct
- like index=12.0 deprecomp pos=verb
  - that index=10.0 dep=mark pos=sconj
  - you index=11.0 dep=nsubj pos=pron
  - Tom index=13.0 dep=pobj pos=propn
    - and index=14.0 deprec pos=cconj
    - Bank index=17.0 dep=conj pos=propn
      - the index=15.0 dep=det pos=det
      - Royal index=16.0 dep=compound pos=propn
      - of index=18.0 dep=prep pos=adp
        - Canada index=19.0 dep=pobj pos=propn
- . index=20.0 dep=punct pos=punct As a result of mapping data for the dependency tree from Table 5, the information extraction tool can generate the corrected dependency tree shown in Table 6, below.

TABLE 6 corrected dependency tree said index=5.0 dep=ROOT pos=VERB
- Rob index=0.0 dep=NSUBJ pos=NOUN
  - teacher index=3.0 dep=APPOS POS=NOUN
    - our index=2.0 dep=POSS pos=DET
- in index=6.0 dep=PREP POS=ADP
  - class index=8.0 dep=POBJ POS=NOUN
    - the index=7.0 dep=DET POS=DET
- like index=12.0 dep=CCOMP pos=VERB
  - that index=10.0 dep=MARK POS=MARK
  - you index=11.0 dep=NSUBJ pos=PRON
  -Tom index=13.0 dep=POBJ POS=NOUN
    - and index=14.0 dep=CC pos=CC
    - Bank index=17.0 dep=CONJ POS=NOUN
      - the index=15.0 dep=DET POS=DET
      - Royal index=16.0 dep=NN POS=NOUN
      - of index=18.0_dep=PREP pos=ADP
        - Canada index=19.0 dep=POBJ pos=NOUN The information extraction tool can generate, as a result of entity analysis, an updated dependency tree, as shown in Table 7, below. For instance, during entity analysis, the information extraction tool can merge the tokens for "royal bank of Canada".

TABLE 7 updated dependency tree said index=5.0 dep=ROOT POSEVERB
- rob index=0.0 dep=NSUBJ POS=NOUN
  - teacher index=3.0 dep=APPOS POS=NOUN
    - our index=2.0 dep=POSS pos=DET
- in index=6.0 dep=PREP pos=ADP
  - class index=8.0 dep=POBJ pos=NOUN
    - the index=7.0 dep=DET pos=DET
- like index=12.0 dep=CCOMP pos=VERB
  - that index=10.0 dep=MARK pos=MARK
  - you index=11.0 dep=NSUBJ pos=PRON
  - tom index=13.0 dep=POBJ pos=NOUN
    - and index=14.0 dep=CC pos=CC
    - royal bank of canada index=17.0 dep=CONJ POS=NOUN
      - the index=15.0 dep=DET POSEDET The information extraction tool can create tokens for the phrases shown in Table 8, below. Each of the tokens can have a corresponding identifier. For instance, the clause tokens for "said" and "like" can have identifiers "C1" and "C2". The actors "Royal Bank of Canada", "Rob"," "Tom", "class", "teacher", and "you" can have identifiers A1"," "A2", etc., respectively. The information extraction tool can create a token for the conjunction "Tom and the Royal Bank of Canada" with an identifier "CONJ1".

TABLE 8 example tokens

| Token | Identifier |
| --- | --- |
| said | C1 |
| like | C2 |
| the Royal Bank of Canada | A1 |
| Rob | A2 |
| Tom | A3 |
| class | A4 |
| teacher | A5 |
| you | A6 |
| our | M1 |
| the (class) | M2 |
| the (royal bank of Canada) | M2 |
| in (the class) | D1 |
| Tom and the Royal Bank of Canada | CONJ1 |

The information extraction tool can generate one or more nested triple representations for the unstructured sentence, such as the examples shown in Table 9, below. The use of identifiers for the nested triple representations can enable the information extraction tool to include an identifier for a first nested triple representation within a second nested triple representation.

TABLE 9 example nested triple representation

| Output | Identifier |
| --- | --- |
| <Rob; is; our teacher;> | O1 |
| <you; like; Tom and the Royal Bank of Canada;> | O2 |
| <you; like; Tom;> | O3 |
| <you; like; the Royal Bank of Canada;> | O4 |
| <Rob; said [in the class]; that O2;> | O5 |

In the nested triple representation <Rob; said [in the class]; that O2;>, "Rob" can be the subject, "said [in the class]" can be a predicate with a descriptor of "[in the class]", and "that O2" can be the object with "that" as an introduction for the object.

During post-processing, the information extraction tool could derive clauses representing "you like Tom" and "you like the Royal Bank of Canada" from the conjunction "Tom and the Royal Bank of Canada". Further, the information extraction tool could derive clauses "Rob said you like Tom in the class" and "Rob said you like the Royal Bank of Canada in the class" from the conjunction.

Using the alias relationship between "Rob" and "our teacher", the information extraction tool can derive clauses representing "our teacher said you like Tom in the class", "our teacher said you like the Royal Bank of Canada in the class", "our teacher said you like Tom and the Royal Bank of Canada in the class".

The information extraction tool can determine one or more final clauses. The final clauses can include, as facts, that "Rob is our teacher" and "Rob said that you like Tom and the Royal Bank of Canada in the class". The final clauses can include, as sub-facts, that "you like Tom and the Royal Bank of Canada". The final clauses can include, as derived facts, that "our teacher said that you like Tom in the class"; "our teacher said that you like the Royal Bank of Canada in the class"; "Rob said that you like Tom in the class"; "Rob said that you like the Royal Bank of Canada in the class"; "our teacher said that you like Tom and the Royal Bank of Canada in the class"; "you like Tom"; "you like the Royal Bank of Canada"; or a combination of two or more of these.

In some examples, a part-of-speech can be a category of words that coarsely describes a semantic role of a corresponding word or phrase. A dependency can be a type of relationship between words. A tree can be a graph-like structure characterized by each node, e.g., token, having a maximum of one inbound connection and unlimited outbound connections. A child token can be a token's immediate outbound connection. A parent token can be a token's immediate inbound connection. A sibling token for a token can be the token's parent's children that don't include the token.

In some situations, the information extraction tool can change one or more rules used during the extraction process, token generation process, or both. For instance, the information extraction tool can use a context in which a rule will be applied to change one or more parameters for the rule. For example, in a sentence such as "I talked to Tom and Sam in the car", "in the car" could be descriptor that only applies to Sam, or to both Tom and Sam. The information extraction tool can use the context for the phrase "in the car" to determine to which other words in the unstructured sentence applies, e.g., instead of always assigning a token for the phrase as a descriptor to one or both of the other words. The context can include data for other sentences, such as sentences in the same paragraph as the unstructured sentence, in the same document, or other appropriate contextual information.

In some implementations, the information extraction tool can use statistical analysis or machine learning or both for any of the processes described in this document. For instance, the information extraction tool can use machine learning during tokenization, mapping, entity analysis, validation, identification, processing, adjustment, post processing, or a combination of two or more of these.

Table 10, below, provides examples of dependency labels that can be used by an information extraction tool.

TABLE 10 example dependency labels

| Label | Description |
|---|---|
| ACOMP | Adjectival complement |
| ADVCL | Adverbial clause |
| ADVMOD | Adverbial modifier |
| APPOS | Appositive |
| ATTR | Attribute |
| AUX | Auxiliary |
| AUXPASS | Passive auxiliary |
| CC | Coordinating conjunction |
| CCOMP | Clausal complement |
| CONJ | Conjunct |
| CSUBJ | Clausal subject |
| CSUBJPASS | Passive clausal subject |
| DEP | Unknown dependency |
| DET | Determiner |
| DOBJ | Direct object |
| EXPL | Pleonastic nominal |

TABLE 10-continued example dependency labels

| Label | Description |
|---|---|
| IOBJ | Indirect object |
| MARK | Introduction |
| MWE | Multi-word expression |
| NEG | Negation |
| NN | Noun part |
| NPADVMOD | Noun phrase adverbial modifier |
| NSUBJ | Noun subject |
| NSUBJPASS | Passive noun subject |
| NUM | Number |
| NUMBER | Number part |
| P | Punctuation |
| PARATAXIS | Parataxis |
| PCOMP | Preposition complement |
| POBJ | Preposition object |
| POSS | Possessive |
| PRECONJ | Conjunction introduction |
| PREDET | Preceding determiner |
| PREP | Preposition |
| PRT | Particle |
| QUANTMOD | Quantifier modifier |
| RCMOD | Relative clause |
| ROOT | Root of the sentence |
| TMOD | Time modifier |
| VMOD | Verbal modifier |
| XCOMP | Headless clausal complement |
| SUFFIX | Name suffix |
| TITLE | Name title |

Table 11, below, provides examples of part-of-speech labels that can be used by an information extraction tool.

TABLE 11 example part-of-speech labels

| Label | Description |
|---|---|
| ADJ | Adjective |
| ADP | Adposition |
| ADV | Adverb |
| AUX | Auxiliary |
| CONJ | Conjunction |
| CC | Coordinating conjunction |
| DET | Determiner |
| INTJ | Interjection |
| NOUN | Noun |
| NUM | Numeral |
| PART | Particle |
| PRON | Pronoun |
| PROPN | Proper noun |
| PUNCT | Punctuation |
| VERB | Verb |

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HyperText Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 4:
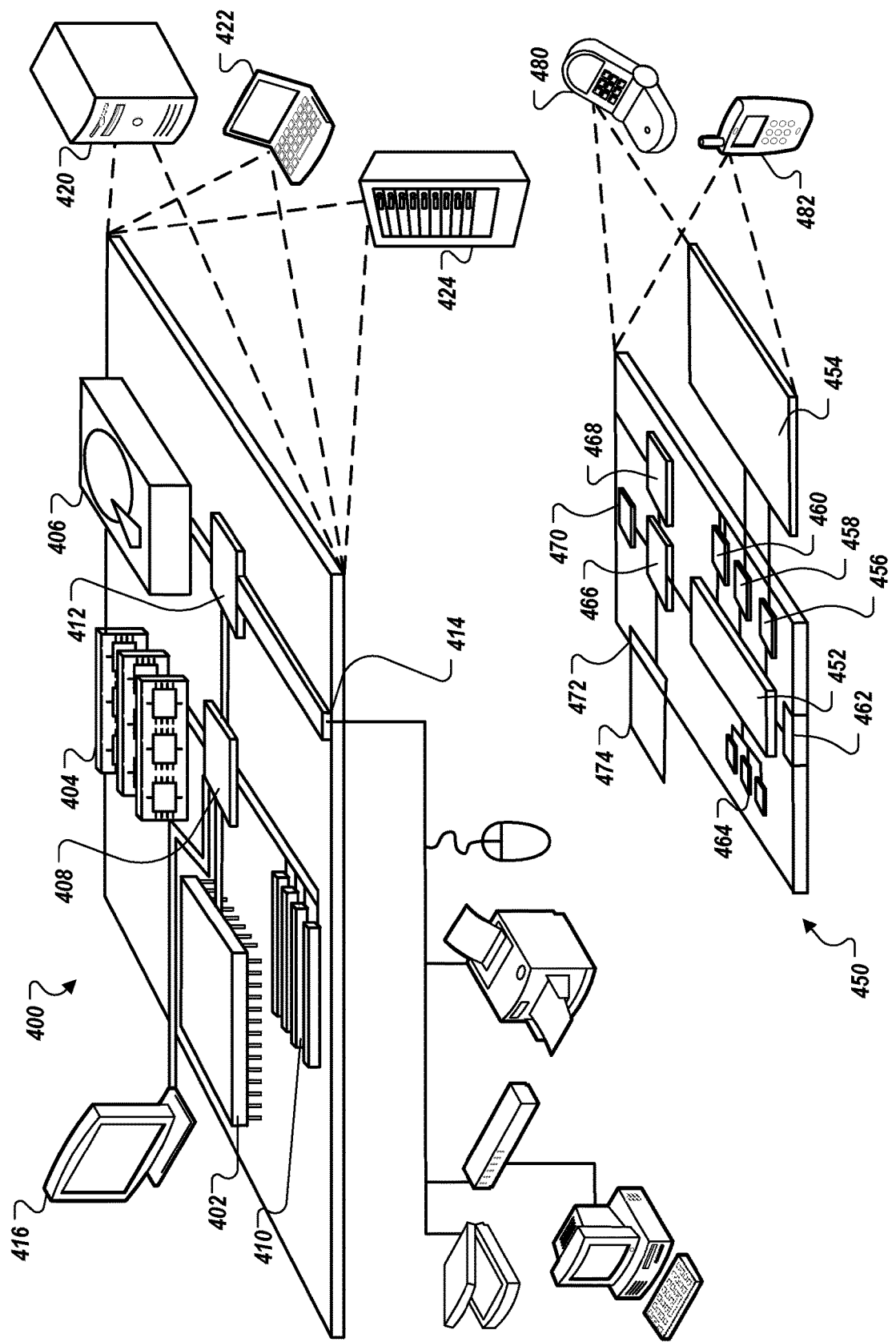
FIG. 4 is a block diagram of a computing system that can be used in connection with computer-implemented methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A computer-implemented method comprising:
    receiving, by a computing device, data representing an unstructured sentence that includes a plurality of words;
    generating, by the computing device, a dependency parse of the unstructured sentence by assigning, to each word of the plurality of words, a dependency relationship label that identifies a relationship between the word and another word of the plurality of words;
    determining, by the computing device and for one or more of the dependency relationship labels, a mapped dependency relationship label based on the dependency relationship label;
    determining, by the computing device and for each word of the plurality of words, a part-of-speech label that identifies a part of speech for the word;
    determining, by the computing device and for each part-of-speech label, a mapped part-of-speech label based on the part-of-speech label; and
    selecting, by the computing device and for two or more words of the plurality of words using the respective dependency relationship labels and the respective mapped part-of-speech labels, the mapped dependency relationship label and the mapped part-of-speech label of one of the two or more words to represent the two or more words as a group dependency relationship label and a group part-of-speech label.

2. The method of claim 1, wherein determining the mapped dependency relationship label based on the dependency relationship label comprises:
    accessing a table that maps one or more respective dependency relationship labels to a respective dependency relationship label.

3. The method of claim 1, wherein determining the mapped part-of-speech label based on the part-of-speech label comprises:
 accessing a table that maps one or more respective part-of-speech labels to a respective part-of-speech label.

4. The method of claim 1, wherein determining the mapped dependency relationship label based on the dependency relationship label comprises:
 accessing rules that indicate a condition to satisfy for mapping one or more respective dependency relationship labels to a respective dependency relationship label.

5. The method of claim 1, wherein determining the mapped part-of-speech label based on the part-of-speech label comprises:
 accessing rules that indicate a condition to satisfy for mapping one or more respective part-of-speech labels to a respective part-of-speech label.

6. The method of claim 1, comprising:
 generating, by the computing device, a dependency tree of the plurality of words based on the dependency relationship labels and the part-of-speech labels.

7. The method of claim 6, comprising:
 updating, by the computing device, the dependency tree based on the mapped dependency relationship labels, the mapped part-of-speech labels, the group dependency relationship label, and the group part-of-speech label.

8. The method of claim 7, comprising:
 determining, by the computing device, whether the dependency tree is valid,
 wherein determining the mapped dependency labels is based on determining that the dependency tree is valid.

9. A system comprising:
 one or more computers; and
 one or more storage devices storing instructions that are operable, when executed by the one or more computers, to cause the one or more computers to perform operations comprising:
 receiving, by a computing device, data representing an unstructured sentence that includes a plurality of words;
 generating, by the computing device, a dependency parse of the unstructured sentence by assigning, to each word of the plurality of words, a dependency relationship label that identifies a relationship between the word and another word of the plurality of words;
 determining, by the computing device and for one or more of the dependency relationship labels, a mapped dependency relationship label based on the dependency relationship label;
 determining, by the computing device and for each word of the plurality of words, a part-of-speech label that identifies a part of speech for the word;
 determining, by the computing device and for each part-of-speech label, a mapped part-of-speech label based on the part-of-speech label; and
 selecting, by the computing device and for two or more words of the plurality of words using the respective dependency relationship labels and the respective mapped part-of-speech labels, the mapped dependency relationship label and the mapped part-of-speech label of one of the two or more words to represent the two or more words as a group dependency relationship label and a group part-of-speech label.

10. The system of claim 9, wherein determining the mapped dependency relationship label based on the dependency relationship label comprises:
 accessing a table that maps one or more respective dependency relationship labels to a respective dependency relationship label.

11. The system of claim 9, wherein determining the mapped part-of-speech label based on the part-of-speech label comprises:
 accessing a table that maps one or more respective part-of-speech labels to a respective part-of-speech label.

12. The system of claim 9, wherein determining the mapped dependency relationship label based on the dependency relationship label comprises:
 accessing rules that indicate a condition to satisfy for mapping one or more respective dependency relationship labels to a respective dependency relationship label.

13. The system of claim 9, wherein determining the mapped part-of-speech label based on the part-of-speech label comprises:
 accessing rules that indicate a condition to satisfy for mapping one or more respective part-of-speech labels to a respective part-of-speech label.

14. The system of claim 9, wherein the operations comprise:
 generating, by the computing device, a dependency tree of the plurality of words based on the dependency relationship labels and the part-of-speech labels.

15. The system of claim 14, wherein the operations comprise:
 updating, by the computing device, the dependency tree based on the mapped dependency relationship labels, the mapped part-of-speech labels, the group dependency relationship label, and the group part-of-speech label.

16. The method of claim 15, wherein the operations comprise:
 determining, by the computing device, whether the dependency tree is valid,
 wherein determining the mapped dependency labels is based on determining that the dependency tree is valid.

17. A non-transitory computer-readable medium storing software comprising instructions executable by one or more computers which, upon such execution, cause the one or more computers to perform operations comprising:
 receiving, by a computing device, data representing an unstructured sentence that includes a plurality of words;
 generating, by the computing device, a dependency parse of the unstructured sentence by assigning, to each word of the plurality of words, a dependency relationship label that identifies a relationship between the word and another word of the plurality of words;
 determining, by the computing device and for one or more of the dependency relationship labels, a mapped dependency relationship label based on the dependency relationship label;
 determining, by the computing device and for each word of the plurality of words, a part-of-speech label that identifies a part of speech for the word;
 determining, by the computing device and for each part-of-speech label, a mapped part-of-speech label based on the part-of-speech label; and
 selecting, by the computing device and for two or more words of the plurality of words using the respective dependency relationship labels and the respective mapped part-of-speech labels, the mapped dependency relationship label and the mapped part-of-speech label of one of the two or more words to represent the two or more words as a group dependency relationship label and a group part-of-speech label.

18. The medium of claim 17, wherein determining the mapped dependency relationship label based on the dependency relationship label comprises:
   accessing a table that maps one or more respective dependency relationship labels to a respective dependency relationship label.

19. The medium of claim 17, wherein determining the mapped part-of-speech label based on the part-of-speech label comprises:
   accessing a table that maps one or more respective part-of-speech labels to a respective part-of-speech label.

20. The medium of claim 17, wherein determining the mapped dependency relationship label based on the dependency relationship label comprises:
   accessing rules that indicate a condition to satisfy for mapping one or more respective dependency relationship labels to a respective dependency relationship label.

21. The medium of claim 17, wherein determining the mapped part-of-speech label based on the part-of-speech label comprises:
   accessing rules that indicate a condition to satisfy for mapping one or more respective part-of-speech labels to a respective part-of-speech label.

22. The medium of claim 17, wherein the operations comprise:
   generating, by the computing device, a dependency tree of the plurality of words based on the dependency relationship labels and the part-of-speech labels.

23. The medium of claim 22, wherein the operations comprise:
   updating, by the computing device, the dependency tree based on the mapped dependency relationship labels, the mapped part-of-speech labels, the group dependency relationship label, and the group part-of-speech label.

24. The medium of claim 23, wherein the operations comprise:
   determining, by the computing device, whether the dependency tree is valid,
   wherein determining the mapped dependency labels is based on determining that the dependency tree is valid.

* * * * *